(12) United States Patent
Nakamura et al.

(10) Patent No.: US 6,354,672 B1
(45) Date of Patent: Mar. 12, 2002

(54) BRAKING SYSTEM WHEREIN BRAKE CYLINDER IS COMMUNICATED WITH PEDAL-OPERATED PRESSURE SOURCE UPON FAILURE OF PUMP-OPERATED PRESSURE SOURCE

(75) Inventors: Eiji Nakamura, Aichi-ken; Akihiro Otomo, Toyota; Fumiaki Kawahata, Toyota; Tetsuya Miyazaki, Toyota; Hiroshi Toda, Kariya, all of (JP)

(73) Assignees: Toyota Jidosha Kabushiki Kaisha, Toyota; Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/678,028

(22) Filed: Oct. 3, 2000

(30) Foreign Application Priority Data

Oct. 8, 1999 (JP) ............................................ 11-288270

(51) Int. Cl.⁷ .......................... B60T 8/40; B60T 13/68; B60T 17/18; B60T 17/22
(52) U.S. Cl. ................................ 303/113.1; 303/114.1; 303/114.3; 303/14; 303/122.09; 303/122.13; 303/116.1; 303/3; 303/10; 303/152; 303/115.1; 303/DIG. 11; 188/358
(58) Field of Search .......................... 303/113.1, 122.13, 303/114.1, 10, 9, 116.1, 13–15, 3, 152, 122.12, 122.09, 114.3, 115.1, 115.4, 115.5, DIG. 10, DIG. 11; 188/358, 359, 356, 357, 106 P; 60/545, 547.1

(56) References Cited

U.S. PATENT DOCUMENTS

| 3,802,745 A | 4/1974 | Strifler et al. |
| 4,812,777 A | * 3/1989 | Shirai ........................... 303/14 |
| 4,817,767 A | 4/1989 | Seibert et al. |
| 5,769,509 A | 6/1998 | Feigel et al. |
| 5,934,767 A | 8/1999 | Schmidt et al. |
| 6,076,897 A | 6/2000 | Binder et al. |
| 6,126,248 A | 10/2000 | Kawahata et al. |
| 6,158,825 A | 12/2000 | Schunck et al. |

FOREIGN PATENT DOCUMENTS

| JP | 63-20256 | 1/1988 |
| JP | 4-232153 | 8/1992 |
| JP | 4-244464 | 9/1992 |
| JP | 5-65060 | 3/1993 |
| JP | 7-336806 | 12/1995 |
| JP | 8-506301 | 7/1996 |
| JP | 10-86804 | 4/1998 |
| JP | 11-115737 | 4/1999 |

OTHER PUBLICATIONS

Wolf–Dieter Jonner, Hermann Winner, Ludwig Dreilich and Eberhardt Schunck; Electrohydraulic Brake System—The First Approach to Brake–By–Wire System; SAE 960991; Mar. 3, 1996; pp. 105–112.

* cited by examiner

Primary Examiner—Douglas C. Butler
(74) Attorney, Agent, or Firm—Oliff & Berridge, PLC

(57) ABSTRACT

A braking system including a brake cylinder, a first hydraulic pressure source having a first pump device for pressurizing a working fluid, a second hydraulic pressure source operable in response to an operation of a brake operating member, to pressurize the fluid to a pressure higher than a value corresponding to an operating force of the brake operating member, and a brake-cylinder-pressure control device operable when the brake cylinder is disconnected from the second hydraulic pressure source, to control the pressure of the fluid pressurized by the first hydraulic pressure source, such that the fluid pressure in the brake cylinder is controlled to a value determined on the basis of the operating force, and wherein an emergency communication device is operated when at least one of the brake-cylinder-pressure control device and the first pump device fails to normally function, to hold the brake cylinder in communication with the second hydraulic pressure source.

27 Claims, 17 Drawing Sheets

[IN OFF STATE OF OIL 84]

[IN ON STATE OF COIL 84]

BRAKING SYSTEM WHEREIN BRAKE CYLINDER IS COMMUNICATED WITH PEDAL-OPERATED PRESSURE SOURCE UPON FAILURE OF PUMP-OPERATED PRESSURE SOURCE

This application is based on Japanese Patent Application No. 11-288270 filed Oct. 8, 2000, the content of which is incorporated hereinto by reference.

BACKGROUND OF THE INVENTION

1. Field of the Invention

The present invention relates to a braking system.

2. Discussion of Related Art

JP-A-5-65060 discloses an example of a braking system, which includes (1) a brake cylinder, (2) a master cylinder operable by a brake operating member, for mechanically pressurizing a working fluid such that the pressure of the pressurized fluid corresponds to an operating force acting on the brake operating member, (3) a power-operated hydraulic pressure source operable with an electric energy supplied thereto, for generating a braking force corresponding the operating force of the brake operating member, and (4) a fluid-communication switching device for fluid communication of the brake cylinder with the power-operated hydraulic pressure source when the power-operated hydraulic pressure source is normal, and with the master cylinder when the power-operated hydraulic pressure source is defective. In this braking system, the power-operated hydraulic pressure source is arranged such that the pressure of the fluid pressurized by the power-operated hydraulic pressure source is higher than that of the fluid pressurized by the master cylinder. Accordingly, when the brake cylinder which has been held in communication with the power-operated hydraulic pressure source is brought into communication with the master cylinder upon detection of a defect of the power-operated hydraulic pressure source, the braking force corresponding to a given operating force of the brake operating member varies unexpectedly to the operator of an automotive vehicle on which the braking system is provided.

SUMMARY OF THE INVENTION

It is therefore an object of the present invention to provide a braking system which is arranged to minimize a change in the braking force which is unexpected to the vehicle operator.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system comprising:
a brake cylinder;
a first hydraulic pressure source including a first pump device operable to pressurize a working fluid;
a second hydraulic pressure source operable in response to an operation of a brake operating member, to pressurize the fluid to a pressure higher than a value corresponding to an operating force acting on the brake operating member;
a brake-cylinder-pressure control device operable when the brake cylinder is disconnected from the second hydraulic pressure source, to control the pressure of the fluid pressurized by the first hydraulic pressure source, for thereby controlling a pressure of the fluid in the brake cylinder to a value determined on the basis of the operating force; and
an emergency communication device operable when at least one of the brake-cylinder-pressure control device and the first pump device fails to normally function, to hold the brake cylinder in communication with the second hydraulic pressure source.

When the brake operating member is operated in the braking system according to the above mode (1) of this invention, the pressure of the fluid pressurized by the first hydraulic pressure is controlled by the brake-cylinder-pressure control device while the brake cylinder is disconnected from the second hydraulic pressure source, such that the fluid pressure in the brake cylinder is controlled to a value determined by the operating force of the brake operating member. The brake-cylinder-pressure control device may be adapted to control the first pump device of the first hydraulic pressure source, to thereby control the fluid pressure in the brake cylinder. Alternatively, the brake-cylinder-pressure control device may include a solenoid-operated control valve for controlling the fluid pressure in the brake cylinder, and a control-valve control device for controlling the solenoid-operated control valve.

Where at least one of the brake-cylinder-pressure control device and the first pump device of the first hydraulic pressure source fails to normally function, the brake cylinder is brought into fluid communication with the second hydraulic pressure source. When the brake operating member is operated, the second hydraulic pressure source pressurizes the fluid to a pressure higher than a value corresponding to the operating force of the brake operating member, and the thus pressurized fluid is delivered to the brake cylinder. Thus, the fluid pressure in the brake cylinder can be made higher in the present braking system than in a braking system in which the second hydraulic pressure source pressurizes the fluid to a pressure value corresponding to the operating force of the brake operating member. This arrangement is effective to reduce the amount of unexpected change of the braking force corresponding to a given amount of operating force of the brake operating member, which unexpected change takes place due to a defect of the brake-cylinder-pressure control device and/or the first pump device.

The first pump device fails to normally function when there is any one of defects such as: a defect (e.g., excessive voltage drop) of the electric power source provided to supply the first pump device with an electric energy; a defect of an electric motor of the first pump device; a defect of a control device (including a driver circuit, and a computer) for controlling the electric motor; and a defect of any sensor for detecting the operating state (e.g., rotating speed) of the electric motor. Where the brake-cylinder-pressure control device includes a solenoid-operated control valve and a control-valve control device for controlling the control valve, the brake-cylinder-pressure control device fails to normally function when there is any one of defects such as: a defect of a solenoid-operated control valve; a defect of an electric power source used to control the control valve; a defect of the control-valve control device; and a defect of any sensor used for controlling the control valve to control the fluid pressure in the brake cylinder. Where the brake-cylinder-pressure control device includes a controller adapted to control the first pump device of the first hydraulic pressure source so as to control the fluid pressure in the brake cylinder, the brake-cylinder-pressure control device fails to normally function when there is any one of defects such as: a defect of the controller; and a defect of any sensor used to control the first pump device.

(2) A braking system according to the above mode (1), wherein the second hydraulic pressure source includes at least one of a booster for boosting the operating force of the brake operating member, and a pressure-increasing device for increasing the pressure of the fluid pressurized when the brake operating member is operated, the braking system further comprising an energy storing portion for storing an energy to be used to operate at least one of the booster and the pressure-increasing device.

In the braking system according to the above mode (2) wherein the energy storing portion is provided, the pressure-increasing device and/or the booster of the second hydraulic pressure source can be operated by the energy stored in the energy storing portion, even if the braking system becomes unable to generate an energy due to an electrical failure, for instance. Thus, the pressure of the fluid pressurized by the second hydraulic pressure source can be increased to a value higher than a value corresponding to the operating force of the brake operating member, so that the amount of change of the braking force which is unexpected to the vehicle operator can be reduced, when the brake cylinder is brought into communication the second hydraulic pressure source, in the event of a failure of the brake-cylinder-pressure control device and/or the first pump device.

The energy storing portion may be adapted to store an energy generated by the braking system per se, or an energy generated by a suitable drive other than the braking system, such as a drive device for driving an automotive vehicle, and a steering device or air-suspension device provided in an automotive vehicle. In the former case, the energy storing portion may be an accumulator provided to store a highly pressurized fluid delivered from the first pump device of the first hydraulic pressure source. In the latter case, the energy storing portion may be any one of: a vacuum tank storing a negative air pressure generated during an operation of an engine of an automotive vehicle; a battery for storing an electric energy generated by an electric generator (alternator) driven by a vehicle engine; a battery for storing an electric energy generated by an electric motor used for driving an electric or hybrid vehicle, when the electric motor is operated in a regenerative braking mode; an accumulator for storing a working fluid pressurized by a pump device of a power steering device of an automotive vehicle, which pump device is driven by an engine; and an air tank (pneumatic accumulator) for storing a compressed air generated by a compressor used in an air suspension system provided in an automotive vehicle. In any case, a considerable portion of the energy generated in an automotive vehicle is generated by consumption of an electric energy. The energy storing portion indicated above is provided to store an energy while the electric system of the vehicle is normal, so that the energy stored in the energy storing portion can be subsequently used in the event of an electrical failure.

Further, the energy storing portion may be a solar battery or cell arranged to store a solar energy. Where the solar cell is used, the amount of consumption of the energy generated by the vehicle can be can be reduced.

The second hydraulic pressure source may include only one of the pressure-increasing device and the booster, or both of them.

(3) A braking system according to the above mode (2), wherein the first hydraulic pressure source includes a first accumulator for storing a pressurized hydraulic fluid as the working fluid pressurized by the first pump device, and wherein the first accumulator serves as the energy storing portion, and the above-indicated at least one of said pressure-increasing device and the booster is hydraulically operated with the pressurized hydraulic fluid stored in the first accumulator.

In the braking system according to the above mode (3), the above-indicated one of the pressure-increasing device and the booster is a hydraulically operated device, and therefore can be operated with the pressurized hydraulic fluid or liquid stored in the first accumulator. When the first pump device of the first hydraulic pressure source fails to normally function, the first hydraulic pressure source is disconnected from the brake cylinder, so that the pressurized hydraulic fluid stored in the first accumulator of the first hydraulic pressure source can be used to activate the brake cylinder while the first hydraulic pressure source is defective. This arrangement permits effective utilization of the hydraulic energy. Further, the pressurized hydraulic fluid can be rapidly supplied from the first accumulator to the hydraulically operated pressure-increasing device and/or booster, thereby assuring activation of the brake cylinder with a reduced delay. In addition, the use of the first accumulator as the energy storing portion, the second hydraulic pressure source need not be provided with an energy storing portion for storing the hydraulic energy for operating the pressure-increasing device and/or the booster, whereby the braking system is available at a reduced cost and can be small-sized.

(4) A braking system according to the above mode (3), wherein the first accumulator has a large storing capacity.

In the braking system according to the above mode (3), the first accumulator is capable of storing a large amount of the pressurized hydraulic fluid, the pressure-increasing and/or the booster can be operated for a comparatively long total operating time after the brake cylinder is brought into communication with the second hydraulic pressure source. If the braking system is provided with an alarm indicator informing the vehicle operator that the brake-cylinder-pressure control device and/or the first pump device fails to normally function, the vehicle operator can drive the vehicle to a suitable place for repairing the braking system, while the vehicle is braked as needed with the brake cylinder being activated with the pressurized hydraulic fluid stored in the first accumulator.

Preferably, the first accumulator has a storing capacity sufficient to enable at least one of the pressure-increasing device and the booster to operate even after the brake cylinder has been operated ten or more times, for instance. The storing capacity of the first accumulator is desirably determined in view of the size of the braking system, and the expected number of operations of the brake cylinder generally required for driving the vehicle to a repairing station.

(5) A braking system according to any one of the above modes (1)–(4), wherein the second hydraulic pressure source includes a hydraulic booster hydraulically operated to boost the operating force of the brake operating member, and wherein the hydraulic booster includes a pressure regulating portion for regulating the pressure of the fluid received from an accumulator, to a value corresponding to the operating force of the brake operating member, and further includes a power piston operatively connected to the brake operating member, the hydraulic booster having a booster chamber which is partially defined by the power piston and located rearwardly of the power piston as viewed in a direction in which the power piston is advanced when the brake operating member is operated, the booster chamber receiving the fluid whose pressure has been regulated by the pressure regulating portion, such that a drive force corresponding to the pressure of the fluid in the booster chamber acts on the power piston in the direction, whereby the operating force of the brake operating member is boosted.

One preferred form of the hydraulic booster included in the second hydraulic pressure source will be described in the DETAILED DESCRIPTION OF THE PREFERRED EMBODIMENTS.

The accumulator described above with respect to the pressure regulating portion of the hydraulic booster may be the first accumulator of the first hydraulic pressure source, which has been described above with respect to the braking system according to the above mode (3).

(6) A braking system according to the above mode (5), comprising a plurality of brake cylinders as the above-indicated brake cylinder, and wherein at least one of the plurality of brake cylinders is connected to the booster chamber while the other (52, 54, 292, 296) of the plurality of brake cylinders is connected to a pressurizing chamber which is partially defined by a pressurizing piston and located frontwardly of the pressurizing piston as viewed in the above-indicated direction, the pressurizing piston being operatively connected to the power piston.

Where the braking system has two mutually independent brake application sub-systems, a first group of at least one brake cylinder included in one of the two brake application sub-systems is connected to the booster chamber of the hydraulic booster, while a second group of at least one brake cylinder is connected to the pressurizing chamber. Even when the accumulator from which the booster chamber receives the pressurized fluid is defective, the fluid pressure in the pressurizing chamber can be increased to a value corresponding to the operating force of the brake operating member. In this respect, the braking system wherein the two brake application sub-systems respectively correspond to a pair of front wheels and a pair of rear wheels of an automotive vehicle, for example, is preferably arranged such that the pressurizing chamber is connected to the brake cylinders for the front wheels.

(7) A braking system according to the above mode (2), wherein the second hydraulic pressure source includes a vacuum booster operable with a negative pressure to boost the operating force of the brake operating member, and the energy storing portion includes a vacuum tank for storing the negative pressure.

In the braking system according to the above mode (7), the vacuum booster included in the second hydraulic pressure source is operated with a negative pressure to boost the operating force of the brake operating member. The vacuum tank may be adapted to store a negative pressure generated while an engine of an automotive vehicle is operated. The vacuum tank may be exclusively used for the braking system. Alternatively, the vacuum tank may be surging tank provided in an engine assembly of the vehicle.

The engine of an automotive vehicle is not always in operation while the vehicle is able to run (e.g., while the ignition switch is on). For instance, the vehicle is placed in an ecology-oriented mode in which the engine is off, while a predetermined condition is satisfied, for instance, while the absence of an intention of the vehicle driver to start the stationary vehicle is detected. Where the engine is frequently turned off under such a condition of the vehicle, the pressure in the vacuum tank may rise towards the atmospheric level. Where the vehicle is a hybrid vehicle, the engine is not always in operation, and the pressure in the vacuum tank may rise towards the atmospheric pressure. Even when the engine is held in operation, the throttle valve is frequently placed in the fully open position, where the engine is operated in a fuel-lean state. In this case, too, the pressure in the vacuum tank may rise towards the atmospheric level. In any of the above-indicated cases, it is desirable to turn on the engine or limit the opening of the throttle valve, when the pressure in the vacuum tank has exceeded a predetermined upper limit which is relatively close to the atmospheric level.

The braking system according to the above mode (7) wherein the energy generated by a device not included in the braking system is utilized is not required to generate the energy for the purpose of operating the vacuum booster. Accordingly, the overall energy efficiency of the vehicle can be improved. Even in the event of an electrical failure of the braking system, the vacuum booster can be operated with a negative pressure.

(8) A braking system according to the above mode (2), wherein the second hydraulic pressure source includes an electrically operated booster operable with an electric energy to boost the operating force of the brake operating member, and the energy storing portion includes a battery for storing the electric energy.

In the braking system according to the above mode (8), the second hydraulic pressure source includes an electrically operated booster operable for boosting the operating force of the brake operating member. As described in detail in the DESCRIPTION OF THE PREFERRED EMBODIMENTS, the electrically operated booster may utilize a drive force produced by an electric motor, or an electromagnetic force produced by a coil and a magnet. The battery serving as the energy storing portion may be a battery for storing an electric energy generated by an electric generator driven by an engine. Where the vehicle drive assembly includes an electric motor for driving an automotive vehicle, the battery serving as the energy storing portion may be a battery for storing an electric energy generated when the electric vehicle drive motor is operated in a regenerative braking mode. The battery serving as the energy storing portion may be a battery included in the vehicle drive assembly, or a battery provided exclusively for operating the electrically operated booster. In the latter case, the operating reliability of the electrically operated booster is improved. In any cases described above, the battery serving as the energy storing portion for operating the electrically operated booster is different or separate from the battery used for supplying the first pump device of the first hydraulic pressure source with an electric energy. This arrangement enables the electrically operated booster to be operated even when the first pump device is not able to normally operate due to a defect of the electric power source used for the first pump device. The battery for operating the electrically operated booster may be a solar cell. In this case, the required amount of consumption of the energy generated by the vehicle can be reduced.

(9) A braking system according to the above mode (2), wherein at least one of the pressure-increasing device and the booster is a pneumatically operated device operable with compressed air, and the energy storing portion includes an air tank for storing the compressed air whose pressure is higher than an atmospheric level.

In the braking system according to the above mode (2), at least one of the pressure-increasing device and the booster is operated with compressed air stored in the air tank.

(10) A braking system according to any one of the above modes (1)–(9), further comprising an emergency enabling device operable when at least one of the brake-cylinder-pressure control device and the first pump device fails to normally function, for enabling the at least one of the pressure-increasing device and the booster to operate.

(11). A braking system according to any one of the above modes (1)–(10), wherein the brake cylinder is provided for braking a wheel of an automotive vehicle, and the brake-cylinder-pressure control device includes:

a solenoid-operated control valve disposed between the first hydraulic pressure source and the brake cylinder and operable according to an amount of electric energy supplied thereto; and a control-valve control portion operable to control the amount of electric energy to be supplied to the solenoid-operated control valve, for controlling the pressure of the fluid in the brake cylinder such that the wheel is braked by the brake cylinder, so as to establish a deceleration value of the automotive vehicle which corresponds to the operating force of the brake operating member.

Where the braking system has a plurality of brake cylinders, the solenoid-operated control valve may be provided for each of the brake cylinders. Alternatively, a plurality of solenoid-operated control valves may be provided for respective brake cylinders.

The solenoid-operated control valve may be a solenoid-operated linear valve device capable of controlling the fluid pressure in the brake cylinder according to an amount of electric energy supplied to the linear valve device, as described below with respect to the following mode (12). Alternatively, the solenoid-operated control valve may be a solenoid-operated shut-off valve which is opened and closed as needed.

(12) A braking system according to any one of the above modes (1)–(11), comprising a plurality of brake cylinders as the brake cylinders, and wherein the brake-cylinder-pressure control device includes a plurality of solenoid-operated linear valve devices for controlling the fluid pressures in the plurality of brake cylinders according to amounts of electric energy supplied to the solenoid-operated linear valve devices.

(13) A braking system according to any one of the above modes (1)–(12), wherein said brake cylinder is provided for braking a wheel of an automotive vehicle, further comprising a regenerative braking device including an electric motor operable to apply a regenerative braking torque to the wheel, and wherein the brake-cylinder-pressure control device includes a cooperative control portion operable while the regenerative braking torque is applied to the wheel, to control the fluid pressure in the brake cylinder.

The braking system according to the present invention may be used on an electric vehicle or a hybrid vehicle. In this case, the electric motor provided to drive the vehicle is operable to apply a regenerative braking torque to a drive wheel of the vehicle, so that both the regenerative braking torque and a hydraulic braking torque generated by the brake cylinder are applied to the vehicle. Namely, the braking system is operated in a cooperative control mode in which the hydraulic braking torque is controlled such that a sum of the regenerative braking torque and the hydraulic braking torque approaches a total vehicle braking torque desired by the vehicle operator. Since it is desirable to maximize the regenerative braking torque for improving the energy efficiency, the hydraulic braking torque is generally controlled while the regenerative braking torque is held at the upper limit determined by the particular running condition of the vehicle. The desired total vehicle braking torque is generally determined to be a value that permits the operator's desired deceleration value of the vehicle, which may be represented by the amount of operation of the brake operating member, for example.

Where at least one of the first pump device and the brake-cylinder-pressure control device fails to normally function while the braking system is operated in the cooperative control mode, the regenerative braking torque is usually zeroed. In this case, the brake cylinder is communicated with the second hydraulic pressure source. Where the second hydraulic pressure source includes the pressure-increasing device and/or the booster, the amount of change of the vehicle braking force corresponding to a given operating force of the brake operating member, which change is unexpected to the vehicle operator, can be reduced.

(14) A braking system according to any one of the above modes (1)–(13), wherein the emergency communication device includes a solenoid-operated shut-off valve which is placed in an open state for fluid communication between the brake cylinder and the second hydraulic pressure source when no electric energy is supplied to the solenoid-operated shut-off valve, and in a closed state for disconnection of the brake cylinder from the second hydraulic pressure source when an electric energy is supplied to the solenoid-operated shut-off valve, the emergency communication device further including a valve control portion for applying the electric energy to the solenoid-operated shut-off valve while the first pump device and the brake-cylinder-pressure control device are normal.

The solenoid-operated valve may or may not be included in the brake-cylinder-pressure control device.

The emergency communication device may include a mechanically operated change valve rather than the solenoid-operated shut-off valve described above. The change valve has a first state in which the brake cylinder is disconnected from the second hydraulic pressure source and is held in fluid communication with the first hydraulic pressure source, and a second state in which the brake cylinder is disconnected from the first hydraulic pressure source and is held in fluid communication with the second hydraulic pressure source. The change valve is mechanically switched from the first state to the second state when the output fluid pressure of the first hydraulic pressure source becomes lower than a lower limit below which the first pump device is estimated to be unable to normally function, or becomes lower than the output fluid pressure of the second hydraulic pressure source.

(15) A braking system according to any one of the above modes (3)–(6), wherein the first hydraulic pressure source includes a plurality of pump devices including the first pump device, the fluid pressurized by at least one of the plurality of pump devices being stored in the first accumulator.

In the braking system according to the above mode (15) wherein the first hydraulic pressure source includes a plurality of pump devices, the fluid pressurized by at least one of the pump devices is stored in the first pump device. When the first pump device fails to normally function, the fluid pressurized by the other normally functioning pump device or devices, if any, may be delivered directly to the second hydraulic pressure source, without the pressurized fluid being once stored in the first accumulator.

(16) A braking system according to the above mode (15), wherein the plurality of pump devices includes at least one low-pressure pump device and at least one high-pressure pump device the having a higher maximum delivery pressure and a lower maximum delivery rate than the at least one low-pressure pump device.

Where the maximum delivery pressure of the low-pressure pump device is higher than the brake cylinder pressure required when the brake operating member is operated with an ordinary operating force, the pressurized fluid delivered from the low-pressure pump is more frequently used than the pressurized fluid delivered from the high-pressure pump device. In this case, it is more effective to arrange the braking system such that the first accumulator stores the pressurized fluid delivered from the high-pressure pump device, rather than the pressurized fluid delivered from the low-pressure pump device, since the pressurized fluid delivered from the high-pressure pump device can be stored in the first accumulator with higher stability, owing to the comparatively infrequent use of the output pressure of the high-pressure pump device for activating the brake cylinder during normal operation of the braking system.

Further, the delivery pressure and rate of the low-pressure pump device can be controlled by controlling the operating state of an electric motor provided in the low-pressure pump device. By controlling the delivery pressure and rate of the low-pressure pump device, the fluid pressure in the brake cylinder can be controlled. In this case, the control device for controlling the low-pressure pump device serves as the brake-cylinder-pressure control device, pressure control valves may be eliminated.

The pump used in each of the plurality of pump devices may be a gear pump or a plunger pump. Where the low-pressure pump device uses a gear pump, the pressure pulsation and operating noise of the low-pressure pump device can be reduced.

(17) A braking system comprising:
 a brake cylinder;
 a first hydraulic pressure source including a first pump device and a first accumulator for storing a working fluid pressurized by the first pump device;
 a second hydraulic pressure source operable in response to an operation of a rake operating member, to pressurize the fluid to a pressure higher than a value corresponding to an operating force acting on the brake operating member, while utilizing the pressurized fluid stored in the first accumulator;
 a brake-cylinder-pressure control device operable when the brake cylinder is disconnected from the second hydraulic pressure source, to control the pressure of the fluid pressurized by the first hydraulic pressure source, such that a pressure of the fluid in the brake cylinder is controlled to a value determined on the basis of the operating force;
 an emergency communication device operable when at least one of the brake-cylinder-pressure control device and the first pump device fails to normally function, to hold the brake cylinder in communication with the second hydraulic pressure source.

The braking system according to the above mode (17) may include the technical feature according to any one of the above modes (1)–(16).

(18) A braking system according to the above mode (17), wherein the second hydraulic pressure source includes a hydraulic booster hydraulically operated to boost the operating force of the brake operating member, while utilizing the pressurized fluid stored in the first accumulator.

(19) A braking system according to the above mode (17) or (19), wherein the second hydraulic pressure source includes:
 a master cylinder operable in response to the operation of the brake operating member, to pressurize the fluid to a pressure corresponding the operating force of the brake operating member; and
 a pressure regulator connected to the master cylinder, the first accumulator and the brake cylinder and mechanically operable to increase the pressure of the pressurized fluid received from the master cylinder while utilizing the pressurized fluid stored in the first accumulator, and apply the increased pressure to the brake cylinder.

In the braking system according to the above mode (19) wherein the second hydraulic pressure source includes the mechanically operated pressure regulator to increase the pressure of the fluid received from the master cylinder, the pressure regulator is operable even when the braking system has an electrical failure or defect. Further, the second hydraulic pressure source may be made simpler in construction than in the braking system wherein the second hydraulic pressure source includes a hydraulic booster.

(20) A braking system according to the above mode (19), wherein the second hydraulic pressure source further includes a communication switching valve disposed between the pressure regulator and said brake cylinder and operable to disconnect the brake cylinder from said pressure regulator and bring the brake cylinder into fluid communication with the master cylinder when the fluid pressure of the pressure regulator becomes lower than a lower limit which is determined by and is not higher than the fluid pressure pressurized by the master cylinder.

The communication switching device may disconnect the brake cylinder from the pressure regulator and bring the brake cylinder into fluid communication with the master cylinder when the fluid pressure of the pressure regulator become lower than the fluid pressure of the master cylinder, or becomes lower than the fluid pressure of the master cylinder by more than a predetermined amount. That is, the lower limit indicated above may be equal to the fluid pressure of the master cylinder, or may be lower than the fluid pressure of the master cylinder by a predetermined amount. In either of these two cases, the communication switching device is mechanically switched for establishing fluid communication of the brake cylinder with the master cylinder, with high stability, when the fluid pressure of the pressure regulator becomes lower than the lower limit, even in the event of an electrical failure of the braking system.

However, the pressure regulator may be constructed such that the brake cylinder is communicated with the master cylinder when the fluid pressure of the pressure regulator becomes lower than a predetermined lower limit. Where this lower limit is determined by the pressure of the fluid pressurized by the master cylinder during a normal operation of the brake operating member, the pressure regulator may be considered to incorporate the communication switching device provided according to the above mode (20).

(21) A braking system according to any one of the above modes (17)–(20), further comprising a high-pressure-fluid supply control device which permits a supply of the pressurized fluid from the first accumulator to the second hydraulic pressure source when at least one of the first pump device and the brake-cylinder-pressure control device fails to normally function, and inhibits the supply when the first pump device and the brake-cylinder-pressure control device are normal.

The high-pressure-fluid supply control device may include a solenoid-operated shut-off valve which is disposed between the first accumulator and the second hydraulic pressure source, for instance, and which is opened when at least one of the first pump device and the brake-cylinder-pressure control device fails to normally function. This shut-off valve is preferably a normally open valve when a solenoid coil of the shut-off valve is de-energized.

(22) A braking system comprising:
 a brake cylinder;
 a first hydraulic pressure source including a first pump device and a first accumulator for storing a working fluid pressurized by the first pump device;
 a second accumulator;
 a second hydraulic pressure source operable in response to an operation of a rake operating member, to pressurize the fluid to a pressure higher than a value corresponding to an operating force acting on the brake operating member, while utilizing a pressurized fluid stored in the second accumulator;
 a brake-cylinder-pressure control device operable to control the pressure of the fluid pressurized by the first hydraulic pressure source, such that a pressure of the fluid in the brake cylinder is controlled to a value determined on the basis of the operating force;
 an emergency communication device operable when at least one of the brake-cylinder-pressure control device and the first pump device fails to normally function, to hold the brake cylinder in communication with the second hydraulic pressure source.

In the braking system according to the above mode (22) of this invention, the second accumulator is provided exclusively for use with the second hydraulic pressure source, in addition to the first hydraulic pressure source included in the first hydraulic pressure source. This arrangement assures improved operating reliability of the braking system than in the braking system wherein the first accumulator is utilized for operating the first hydraulic pressure source.

When the brake-cylinder-pressure control device and the first pump device are both normal (while the fluid pressure in the brake cylinder is controlled by the brake-cylinder-pressure control device), the brake cylinder may be either disconnected from or communicated with the second hydraulic pressure source.

The braking system according to the above mode (22) may include the technical feature according to any one of the above modes (1)–(21).

(23) A braking system according to the above mode (22), further comprising a second pump device operable to pressurize the working fluid, and wherein the second accumulator stores the fluid pressurized by the second pump device.

In the braking system according to the above mode (23) wherein the second accumulator stores the fluid pressurized by the second pump device provided exclusively for the second hydraulic pressure source, the operating reliability is further improved. Since the pressurized fluid stored in the second accumulator is used exclusively and only for operating the brake cylinder when at least one of the brake-cylinder-pressure control device and the first pump device fails to normally function, the amount of energy stored in the second accumulator is larger than that stored in the first accumulator, so that the pressure-increasing device and/or the booster of the second hydraulic pressure source can be operated for a longer period of time after the brake-cylinder-pressure control device and/or the first pump device fail or fails.

(24) A braking system according to the above mode (22), further comprising:
 a fluid passage connecting the second accumulator and the first pump device;
 a switch valve disposed in the fluid passage, the switch valve being operated from an open state for fluid communication of the second accumulator with the first pump device to a closed state for inhibiting the communication of the second accumulator with the first pump device when at least one of the brake-cylinder-pressure control device and the first pump device fails to normally function.

The second pump device need not be provided in addition to the first pump device, since the second accumulator may be arranged to store the fluid pressurized by the first pump device. The braking system according to the above mode (24) including only the first pump device is smaller in size and more economical to manufacture, than the braking system including the first and second pump devices.

When the switch valve is placed in its open state, the fluid pressurized by the first pump device can be supplied to the second accumulator. When the switch valve is placed in the closed state, the pressurized fluid stored in the second accumulator is prevented from being undesirably delivered back to the first hydraulic pressure source, so that the pressure-increasing device and/or the booster of the second hydraulic pressure source can be operated with stability.

When the brake-cylinder-pressure control device is defective, for instance, the pressurized fluid may leak through the first hydraulic pressure source and the defective brake-cylinder-pressure control device. While the pressurized fluid is not supplied from the first pump device to the second accumulator, it is preferable to disconnect the second accumulator from the first pump device.

(25) A braking system comprising:
 a brake cylinder;
 a first hydraulic pressure source including a pump device operable to pressurize a working fluid;
 a second hydraulic pressure source operable in response to an operation of a brake operating member, to pressurize the fluid to a pressure higher than a value corresponding to an operating force acting on the brake operating member, the second hydraulic pressure source including at least one of a booster for boosting the operating force of the brake operating member, and a pressure-increasing device for increasing the pressure of the fluid pressurized when the brake operating member is operated;
 a brake-cylinder-pressure control device operable to control the pressure of the fluid pressurized by the first hydraulic pressure source such that a pressure of the fluid in the brake cylinder is controlled to be a value determined on the basis of the operating force; and
 an emergency enabling device operable when at least one of the brake-cylinder-pressure control device and the pump device fails to normally function, for permitting an operation of the at least one of the brake-cylinder-pressure control device and the pump device, which operation has been inhibited.

The operation of at least one of the pressure-increasing device and/or the booster of the second hydraulic pressure source is required only when and after at least one of the brake-cylinder-pressure control device and the pump device fails to normally function. In other words, the operation of the pressure-increasing device and/or the booster is not required while the brake-cylinder-pressure control device and the pump device are both normal. Since this operation of the pressure-increasing device and/or the booster is inhibited by the emergency enabling device, the amount of energy consumption by the braking system is reduced according to the above mode (25) of the invention.

When at least one of the brake-cylinder-pressure control device and the pump device fails to normally function during an operation of the brake pedal, at least one of the pressure-increasing device and the booster is immediately activated by the emergency enabling device. In this sense, the emergency enabling device may be considered to be an emergency activating device for activating the pressure-increasing device and/or the booster.

The braking system according to the above mode (25) may include the technical feature according to any one of the above modes (1)–(24).

(26) A braking system comprising:

a brake cylinder;

a first hydraulic pressure source including a pump device operable to pressurize a working fluid;

a second hydraulic pressure source operable in response to an operation of a brake operating member, to pressurize the fluid, the second hydraulic pressure source including a booster for boosting an operating force of a brake operating member;

a brake-cylinder-pressure control device operable to control the pressure of the fluid pressurized by the first hydraulic pressure source such that a pressure of the fluid in the brake cylinder is controlled to be a value determined on the basis of the operating force; and an emergency boosting-ratio control device operable when at least one of the brake-cylinder-pressure control device and the pump device fails to normally function, for controlling a boosting ratio of the booster while the brake cylinder is held in communication with said second hydraulic pressure source.

In the braking system according to the above mode (26) of this invention, the second hydraulic pressure source includes a booster whose boosting ratio can be controlled to control the fluid pressure in the brake cylinder, even when at least one of the brake-cylinder-pressure control device and the pump device fails to normally function.

The emergency boosting-ratio control device, which is capable of controlling the boosting ratio of the booster when the pump device and/or the brake-cylinder-pressure control device is/are defective, is desirably operated with an energy source which is separate from an energy source used for the pump device and the brake-cylinder-pressure control device.

The braking system according to the above mode (26) may include the technical feature according to any one of the above modes (1)–(25).

(27) A braking system comprising:

a brake cylinder;

a first hydraulic pressure source including a pump device operable to pressurize a working fluid;

a second hydraulic pressure source operable in response to an operation of a brake operating member, to pressurize the fluid to a pressure higher than a value corresponding to an operating force acting on the brake operating member, while utilizing a highly pressurized fluid;

a brake-cylinder-pressure control device operable when the brake cylinder is disconnected from the second hydraulic pressure source, to control the pressure of the fluid pressurized by the first hydraulic pressure source, such that a pressure of the fluid in the brake cylinder is controlled to a value determined on the basis of the operating force; and an emergency communication device operable when at least one of the brake-cylinder-pressure control device and the pump device fails to normally function, to hold the brake cylinder in communication with the second hydraulic pressure source.

In the braking system according to the above mode (27) of this invention, the fluid pressurized by the first hydraulic pressure source is controlled to control fluid pressure in the brake cylinder, with the brake cylinder being disconnected from the second hydraulic pressure source, while the braking system is normal. When at least one of the brake-cylinder-pressure control device and the pump device fails to normally function, the brake cylinder is communicated with the second hydraulic pressure source. The second hydraulic pressure source may include a hydraulic booster or a pressure-increase device.

The braking system according to the above mode (17) may include the technical feature according to any one of the above modes (1)–(26).

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
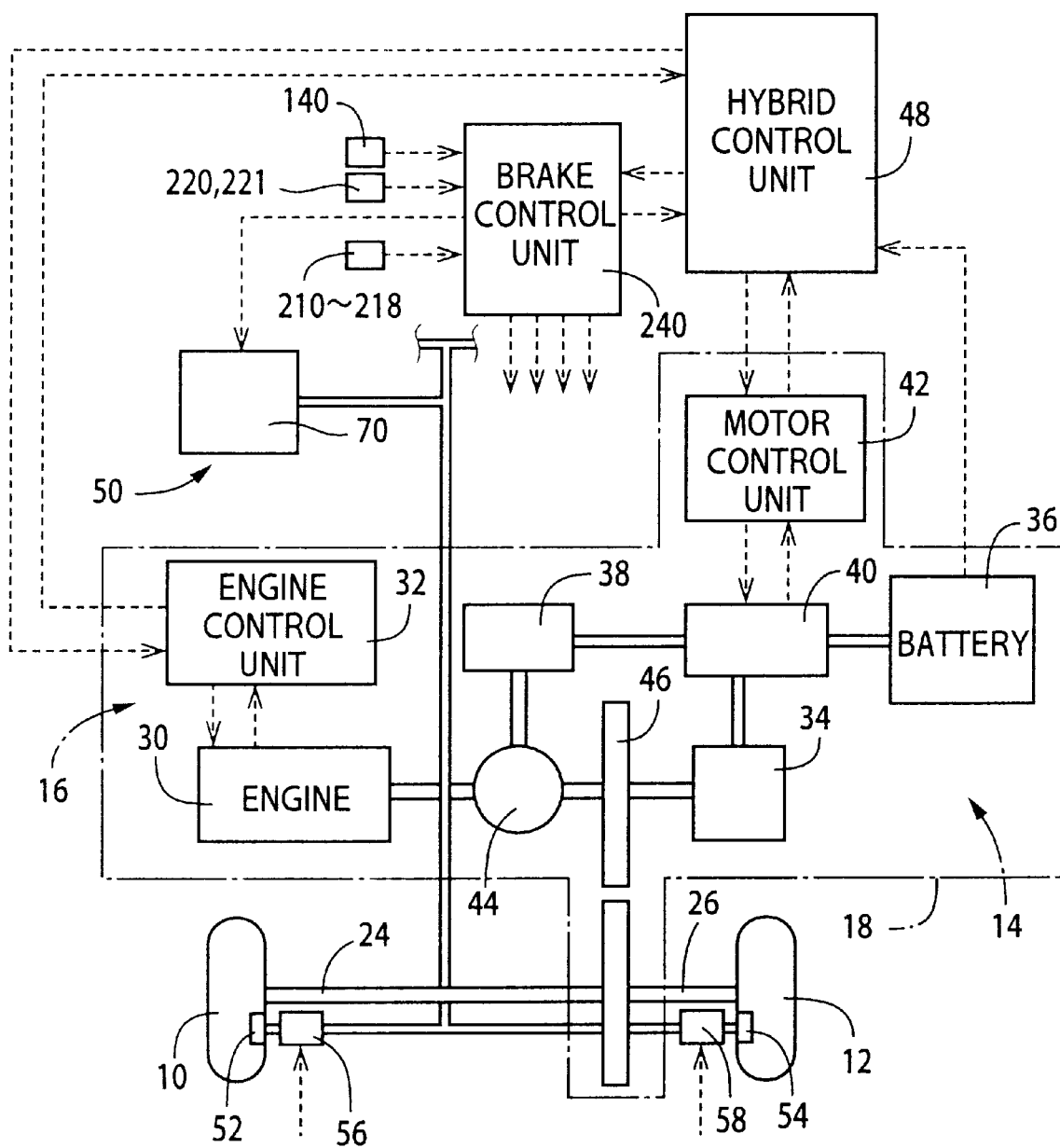
FIG. 1 is a schematic view showing a part of an automotive vehicle equipped with a braking system constructed according to one embodiment of the present invention.
Figure 2:
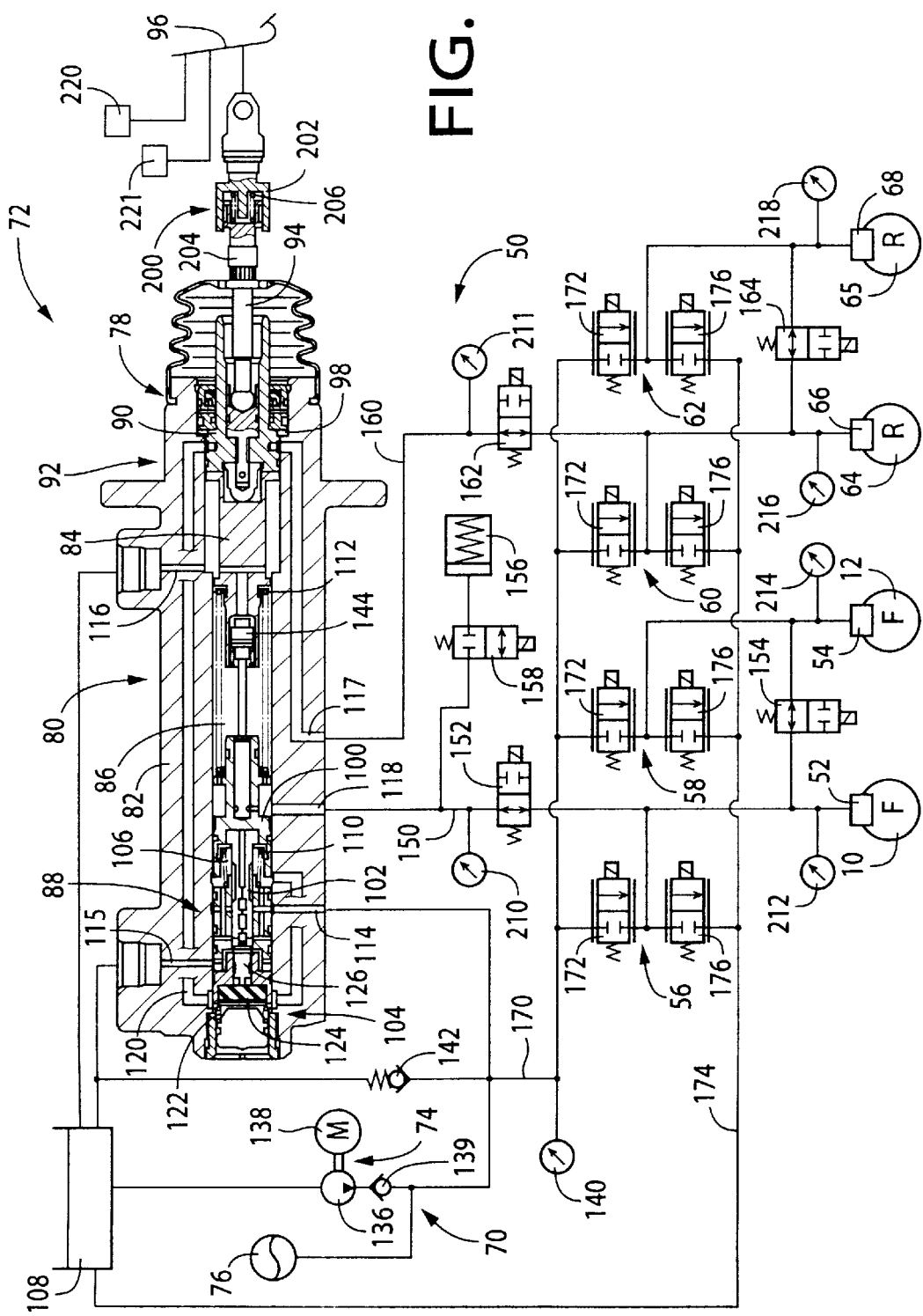
FIG. 2 is a hydraulic circuit diagram showing a hydraulic braking device included in the braking system of FIG. 1.
Figure 3:
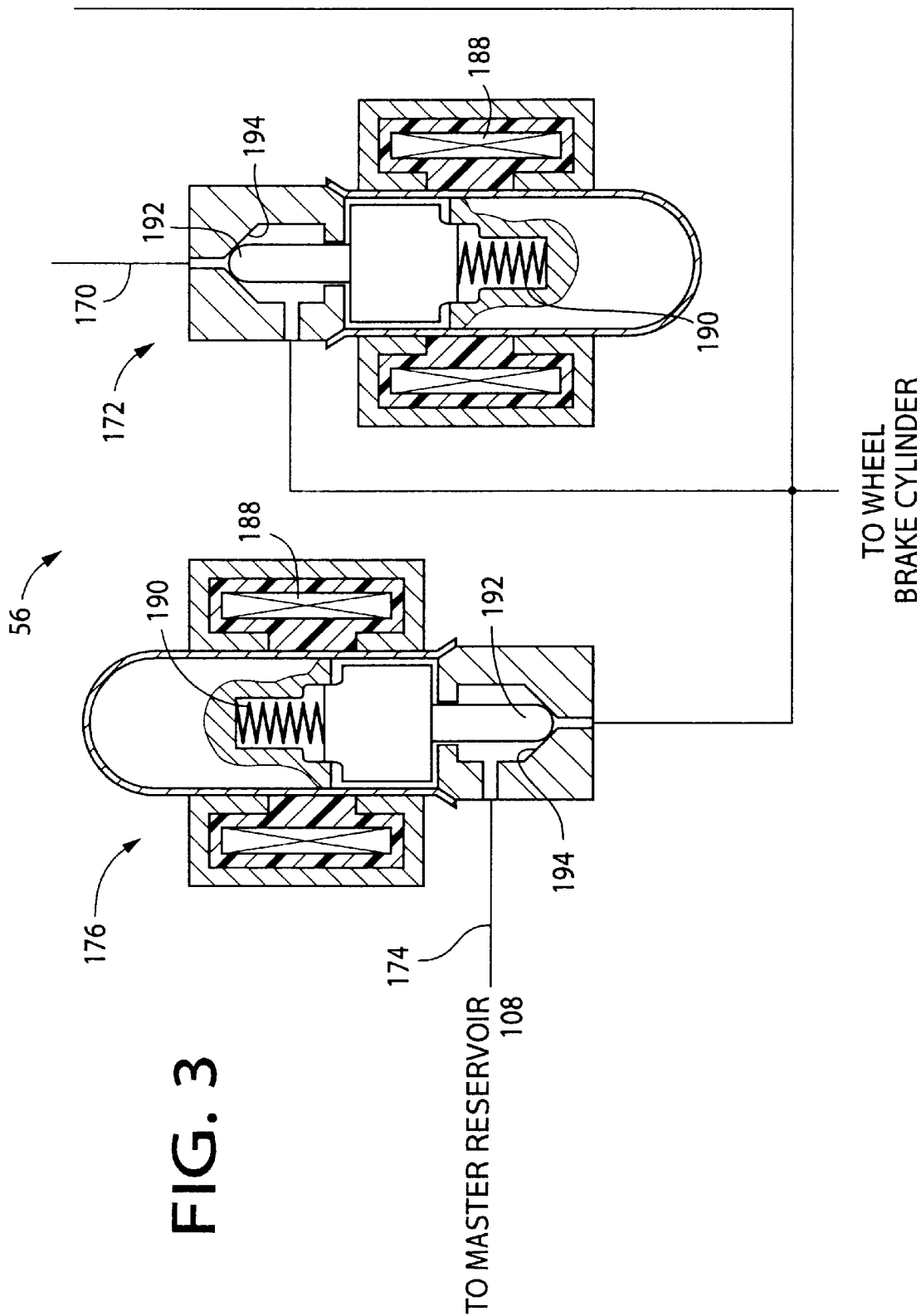
FIG. 3 is an elevational view partly in cross section of a linear valve device included in the hydraulic braking device of FIG. 2.

Referring first to FIGS. 1–3, there will be described a braking system constructed according to the first embodiment of this invention, for use on a hybrid vehicle wherein front wheels 10, 12 as drive wheels are driven by a drive assembly 18 which includes an electric drive device 14 and an internal combustion drive device 16. A drive force generated by the drive assembly 18 is transmitted to the front drive wheels 10, 12 through drive axles 24, 26, respectively.

The internal combustion drive device 16 includes an engine 30, and an electronic engine control unit 32 for controlling the operating state of the engine 30. The electric drive device 14 includes an electric motor 34, a battery 36, an electric generator 38, a power converting device 40, an electronic motor control unit 42, and a power distributing mechanism 44. The power distributing mechanism 44 includes a planetary gear mechanism, which has a sun gear connected to the electric generator 34, a ring gear connected to an output member 46 and the electric motor 34, and a carrier connected to the output shaft of the engine 30. With the engine 30, electric motor 34 and electric generator 38 being suitably controlled, only a drive torque of the electric motor 34 or a sum of a drive torque of the engine 30 and the drive torque of the electric motor 34 is selectively transmitted to the output member 46 through the power distributing mechanism 44.

The power converting device 40 includes an inverter, and is controlled by the motor control unit 42. With an electric current control by the inverter, the electric motor 34 is selectively placed in a vehicle-drive state and a charging state. In the vehicle-drive state, the electric motor 34 is operated with an electric energy supplied from the battery 38. In the charging state, the electric motor 34 is operated as an electric generator by a kinetic energy of the vehicle, so as to generate an electric energy for charging the battery 38, and so as to apply a regenerative braking torque to the front drive wheels 10, 12. Thus, the electric drive device 14 may be considered to be a regenerative braking device for applying the regenerative braking torque of the electric motor 34 to the front wheels 10, 12. The motor control unit 42 controls the power converting device 40, on the basis of a control command received from a hybrid control unit 48.

The present braking system includes a frictional braking device in the form of a hydraulic braking device 50, which includes wheel brake cylinders 52, 54 hydraulically operated to force respective pairs of friction pads against respective rotors rotating with the respective front wheels 10, 12, so that hydraulic braking torques are applied to the front wheels 10, 12. Thus, each of the front wheels 10, 12 can be braked by at least one of the hydraulic braking torque and the regenerative braking torque.

The hydraulic braking device 50 including the front wheel brake cylinders 52, 54 for the front wheels 10, 12 further includes linear valve devices 56, 58, 60, 62, rear wheel brake cylinders for respective rear wheels 64, 65, a first hydraulic pressure source 70, and a second hydraulic pressure source in the form of a master cylinder 72 equipped with a hydro-booster, as shown in FIG. 2.

The first hydraulic pressure source 70 includes a first pump device 74 and a first accumulator 76, and the master cylinder 72 with the hydro-booster (hereinafter referred to as the "second hydraulic pressure source") includes a hydraulic booster 78 and a master cylinder 80.

The master cylinder 80 includes a housing 82, and a pressurizing piston 84 fluid-tightly and slidably fitted in the housing 82. The pressurizing piston 84 cooperates and the housing 82 to define a pressurizing chamber 86. The pressure of a working fluid in the pressurizing chamber 86 is increased as the pressurizing piston 84 is advanced.

The hydraulic booster 78 includes a pressure regulating portion 88, and an input portion 92 having a power piston 90. The pressure regulating portion 88 is adapted to regulate the pressure of the pressurized fluid delivered from the first hydraulic pressure source. The power piston 90 is operatively connected to a brake pedal 96 through an operating rod 94. The power piston 90 partially defines a rear pressurizing chamber in the form of a booster chamber 98 on its rear side. The pressurized fluid whose pressure is regulated by the pressure regulating portion 88 is supplied to the booster chamber 98, so that a force based on the pressure of this pressurized fluid acts on the power piston 90 in the forward direction, whereby the operating force applied to the brake pedal 96 is boosted by the hydraulic booster 78. The above-indicated force based on the pressure of the fluid in the booster chamber 98, which acts on the power piston in the forward direction, will be referred to as a "boosting force".

The pressure regulating device 88 includes a pressure regulating piston 100, a spool 102, and a reaction-force applying device 104. The pressure regulating piston 100 partially defines a pressure regulating chamber 106 on its front side. With an action of the spool 102, the pressure regulating chamber 106 is selectively brought into fluid communication with the accumulator 76 or a master reservoir 108, or disconnected from both of the accumulator 76 and the master reservoir 108, so that the fluid pressure in the pressure regulating chamber 106 is regulated to a value corresponding to the operating force of the brake pedal 96. The spool 102 and the pressure regulating piston 100 are moved together as a unit.

A return spring 110 is disposed between the spool 102 and the housing 82, while a return spring 112 is disposed between the pressure regulating piston 100 and the pressurizing piston 84. The return springs 110 and 112 biases the spool 102 and the pressurizing piston 84 in the rearward direction, respectively.

A preset load of the return spring 112 disposed between the pressurizing piston 84 and the pressure regulating piston 100 is larger than that of the return spring 110 disposed between the spool 102 and the housing 82. Accordingly, when the drive force acting on the pressurizing piston 84 in the forward direction is smaller than the preset load of the return spring 112 and is larger than the preset load of the return spring 110, the pressure regulating piston 100 is advanced with an advancing movement of the pressurizing piston 84, and the spool 102 is advanced. When the drive force acting on the pressurizing piston 84 becomes larger than the present load of the return spring 112, the pressurizing piston 84 is advanced relative to the pressure regulating piston 100, so that the volume of the pressurizing chamber 86 is reduced.

The housing 82 has a plurality of ports 114–118. The port 114 serves as a high-pressure port connected to the first hydraulic pressure source 70, and the ports 115, 116 serve as low-pressure ports connected to the master reservoir 108. Further, the port 118 serves as a brake port communicating with the pressurizing chamber 86 and connected to the front wheel brake cylinders 52, 54, while the port 116 serves as a brake port communicating with the booster chamber 98 and connected to the rear wheel brake cylinders 66, 68. The booster chamber 98 is connected to the pressure regulating chamber 106 through a fluid passage 120, so that the fluid pressure regulated by the pressure regulating portion 88 is applied to the rear wheel brake cylinders 66, 68. The fluid passage 120 is held in communication with a fluid chamber 122. As described below, the reaction-force applying device 104 is operated based on the fluid pressure in the fluid chamber 122.

When the spool 102 is located at its fully retracted position, the master reservoir 102 is communicated through the low-pressure port 115 with the pressure regulating chamber 106 in front of the pressure regulating piston 100. The pressure regulating chamber 106 and the booster chamber 98 are both exposed to the atmosphere.

When the spool 102 is advanced with an advancing movement of the pressure regulating piston 100, the pressure regulating chamber 106 is disconnected from the master reservoir 108, and is brought into communication with the first hydraulic pressure source 70 through the high-pressure port 114, so that the fluid pressure in the pressure regulating chamber 106 is increased and is applied to the booster chamber 98 through the fluid passage 120. The power piston 90 receives the operating force of the brake pedal 96 (brake operating force) and the boosting force, and the power piston 90 and the pressurizing piston 84 are advanced. Thus, the brake operating force is boosted, and the fluid pressure corresponding to the boosted brake operating force is generated in the pressurizing chamber 86. The pressure regulating piston 100 is held at a position at which there is established an equilibrium between a force which acts on the piston 100 in the forward direction (leftwards as seen in FIG. 2) based on the fluid pressure in the pressurizing chamber 86, and a force which acts the piston in the rearward direction (rightwards as seen in FIG. 2) based on the fluid pressure in the pressure regulating chamber 106 and the biasing force of the return spring 110. Accordingly, the position of the spool 102 relative to the housing 82 is determined, and the fluid pressure in the pressure regulating chamber 106 is regulated to a value corresponding to the brake operating force acting on the brake pedal 96.

As the force acting on the pressure regulating piston 100 in the forward direction is increased, the fluid pressure in the pressure regulating chamber 106 is increased, and the fluid pressure in the fluid chamber 122 is increased, so that a reaction disc 124 in the reaction-force applying device 104 is deformed by a force acting in the rearward direction. A reaction force of the reaction disc 124 is applied to the spool 102 through a reaction rod 126. Namely, the reaction force applied to the brake pedal 96 through the pressure regulating piston 100 and the pressurizing piston 84 is increased, so that the boosting ratio of the hydraulic booster 78 is reduced as the brake operating force is increased.

In the first hydraulic pressure source 70, the pump device 74 is adapted to pressurize the fluid received from the master reservoir 108, and the fluid pressurized by the pump device 74 is stored in the accumulator 76. The pump device 74 includes a pump 136, an electric motor 138 for driving the pump 136, and a check valve 139. The pressure of the pressurized fluid delivered from the first hydraulic pressure source 70 is detected by a pressure sensor 140. In other words, the pressure sensor 140 is able to detect the pressure of the fluid stored in the accumulator 76. The electric motor 138 is controlled on the basis of the output signal of the pressure sensor 140 so that the pressure of the pressurized fluid in the accumulator 76 is held within a predetermined range. In the present embodiment, the accumulator serves as an energy storing portion.

The pump 136 may be either a plunger pump or a gear pump.

A pressure relief valve 142 is provided in a fluid passage connecting the delivery side of the pump 136 and the master reservoir 108, in order to prevent an excessive rise of the pressure of the delivery pressure of the pump 136.

In the second hydraulic pressure source 72, a fluid pressure is generated when the brake pedal 96 is operated. Upon depression of the brake pedal 86, the power piston 90 and the pressurizing piston 84 are advanced, and the pressure regulating piston 100 and the spool 102 are advanced. Consequently, the fluid pressure in the pressure regulating chamber 106 is increased by the pressurized fluid received from the first hydraulic pressure source 70, to a value corresponding to the operating force acting on the brake pedal 96. The thus regulated pressure in the pressure regulating chamber 106 is applied to the booster chamber 98. The pressurizing piston 84 is advanced by the brake operating force and the boosting force, so as to increase the fluid pressure in the pressurizing chamber 86. The fluid pressure in the booster chamber 98 is applied to the rear wheel brake cylinders 66, 68, while the fluid pressure in the pressurizing chamber 86 is applied to the front wheel brake cylinders 52, 54.

When the brake operating force is reduced, the force acting on the pressurizing piston 84 is accordingly reduced, and the fluid pressure in the pressurizing chamber 86 is accordingly reduced, so that the pressure regulating piston 100 is retracted. As a result, the spool 102 is retracted, and the pressure regulating chamber 106 is brought into communication with the master reservoir 108, and the fluid pressure in the chamber 106 is reduced.

The fluid in the pressurizing chamber 86 is returned to the master reservoir 108 through a center valve 144 and the low-pressure port 116.

The front wheel brake cylinders 52, 54 are connected to the pressurizing chamber 86 through a fluid passage 150. A solenoid-operated shut-off valve 152 is provided in the fluid passage 150, and a solenoid-operated shut-off valve 154 is provided in a fluid passage connecting the two front wheel brake cylinders 52, 54. A stroke simulator 156 is connected through a solenoid-operated shut-off valve 158 to a portion of the fluid passage 150 between the solenoid-operated shut-off valve 152 and the brake port 118. On the other hand, the rear wheel brake cylinders 55, 58 are connected to the booster chamber 98 through a fluid passage 160. A solenoid-operated shut-off valve 162 is provided in the fluid passage 160, and a solenoid-operated shut-off valve 164 is provided in a fluid passage connecting the two rear wheel brake cylinders 66, 68.

Each of the solenoid-operated shut-off valves 152, 162 is placed in its closed state for disconnecting the wheel brake cylinders 52, 54, 66, 68 from the second hydraulic pressure source 72, when an electric current is applied to the solenoid coil of the shut-off valve 152, 162. When the solenoid coil is de-energized, the shut-off valve 152, 162 is placed in its open sate for connecting the wheel brake cylinders 52, 54, 66, 68 to the second hydraulic pressure source 72. Thus, the shut-off valves 152, 162 are normally-open valves. In the present embodiment, the solenoid-operated shut-off valves 152, 162 constitute an emergency communication device operable for fluid communication of the wheel brake cylinders 52, 54, 66, 68 with the second hydraulic pressure source 72, when the pump device 74 of the first hydraulic pressure source 70, for example, fails to normally operate or function. The solenoid-operated shut-off valve 158 is a normally closed valve, while the solenoid-operated shut-off valves 154, 164 are normally open valves.

The wheel brake cylinders 52, 54, 66, 68 are connected to the pump device 74 of the first hydraulic pressure source 70 through a fluid passage 170. Four pressure-increasing linear valves 172 are provided in respective four branch passages of the fluid passage 170 which are connected to the respective wheel brake cylinders 52, 54, 66, 68. The wheel brake cylinders 52, 54, 66, 68 are further connected to the master reservoir 108 through a fluid passage 174. Four pressure-reducing valves 176 are provided in respective four branch passages of the fluid passage 174 which are connected to the respective wheel brake cylinders 52, 54, 66, 68. The four pairs of pressure-increasing and pressure-reducing linear valves 172, 176 constitute the respective four linear solenoid valve devices 56, 58, 60, 62 corresponding to the respective four wheel brake cylinders 52, 54, 66, 68 indicated above. Since these four linear solenoid valve devices 56, 58, 60, 62 have the same arrangement, the linear solenoid valve device 56 will be described by way of example, and the description of the other valve devices 58, 60, 62 is dispensed with.

The pressure-increasing linear valve 172 and the pressure-reducing linear valve 176 are normally closed valves, namely, placed in their closed state of FIG. 3 when an electric current is not applied to their solenoid coil 188. In the closed state, a valve member 192 is held seated on a valve seat 194 under a biasing force of a spring 190, as shown in FIG. 3.

When an electric current is applied to the solenoid coil 188, an electromagnetic drive force acts on the valve member 192 in a direction for moving the valve member 192 away from the valve seat 194. Further, a differential pressure force based on a fluid pressure difference across the linear valve 172, 176 also acts on the valve member 192 in the above-indicated direction for moving the valve member 192 away from the valve seat 194. That is, the valve member 192 receives a biasing force of the spring 190, the electromagnetic drive force and the fluid pressure differential force. The position of the valve member 192 relative to the valve seat 194 is determined by these forces. The electromagnetic force increases with an increase in the amount of electric current applied to the solenoid coil 188.

As the electromagnetic force is increased with an increase in the electric current applied to the solenoid coil 188, the force acting on the valve member 192 in the direction for forcing the valve member 192 onto the valve seat 194 is reduced. When a sum of the pressure differential force and the electromagnetic drive force becomes larger than the biasing force of the spring 190, the valve member 192 is moved away from the valve seat 194. The fluid pressure difference across the linear valve 172, 176 when the valve member 192 is moved away from the valve seat 194 will be referred to as a "valve opening pressure difference" of the linear valve 172, 176. This pressure opening pressure difference is reduced as the amount of electric current applied to the solenoid coil 188 is increased. In the pressure-increasing linear valve 172, the pressure differential force acting on the valve member 192 is a force based on a difference between the output pressure of the first hydraulic pressure source 70 and the fluid pressure in the corresponding wheel brake cylinder 52, 54, 66, 68. In the pressure-reducing linear valve 176, the pressure differential force is a force based on a difference between the fluid pressure in the master reservoir 108 and the fluid pressure in the corresponding wheel brake cylinder 52, 54, 66, 68. By controlling the electromagnetic drive force (by controlling the amount of electric current to be applied to the solenoid coil 188) in the linear valve 172, 176, the fluid pressure in each wheel brake cylinder 54, 56, 66, 68 can be controlled. The linear valve devices 56–62 and the first hydraulic pressure source 70 are considered to constitute a dynamic pressure system, while the second hydraulic pressure source 72 is considered to constitute a static pressure system. In the dynamic pressure system, the working fluid can be pressurized to a predetermined value, without an operation of the brake pedal 96. In the static pressure system, on the other hand, the fluid is pressurized to a value corresponding to the operating force or amount of the brake pedal 96.

The operating rod 94 is provided with a stroke simulator 200. The stroke simulator 200 includes a pedal-side rod 202 on the side of the operating rod 94, a pressure-source-side rod 204 on the side of the second hydraulic pressure source 72, and a spring 206 through which the pedal-side rod 202 and the pressure-source-side rod 204 engage each other such that the pedal-side rod 202 is movable relative to the pressure-source-side rod 204.

In the present hydraulic braking device 50, there are provided pressure sensors 210, 211 for detecting the fluid pressure in the pressurizing chamber 86 and the booster chamber 98 of the second hydraulic pressure source 72, respectively, and four pressure sensors 212, 214, 216, 218 for detecting the fluid pressures in the respective wheel brake cylinders 52, 54, 66, 68. Two stroke sensors 220, 221 are provided for detecting the operating amount or stroke of the brake pedal 96. A desired vehicle braking torque (desired total braking torque) which is a braking torque desired by the vehicle operator is obtained on the basis of the output signals of the stroke sensors 22, 221 and the pressure sensors 210, 211. Namely, the desired vehicle braking torque is obtained on the basis of the output signals of the stroke sensors 220, 221 during an initial period of operation of the brake pedal 96, and on the basis of the output signals of the pressure sensors 220, 221 during the subsequent period of operation of the brake pedal 96. Since the desired vehicle braking torque is obtained on the basis of the output signals of the stroke sensors 220, 221 during the initial period of operation of the brake pedal 96, a delay in an increase in the fluid pressurized by the second hydraulic pressure source 72 upon operation of the brake pedal 96 can be reduced. Although the provision of the two stroke sensors 220, 221 is not essential, the use of the two stroke sensors 220, 221 improves the operating reliability of the hydraulic braking device 50. The fluid pressure values (the pressure in the pressurizing chamber 86 and the pressure in the booster chamber 98) detected by the two pressure sensors 210, 211 are not necessarily equal to each other, but both of these two pressure values correspond to the operating force acting on the brake pedal 96.

The provision of the four sensors 220, 221, 210, 211 is not essential to obtain the desired vehicle braking force (total braking force). These sensors may be replaced by a single pedal force sensor adapted to detect the operating force of the brake pedal 96, so that the desired vehicle braking force is obtained on the basis of the output signal of the pedal force sensor.

The hydraulic braking device 50 is controlled by an electronic brake control unit 240 shown in FIG. 1. The brake control unit 240 receives control signals from the hybrid control unit 48. Each of the hybrid control unit 48, brake control unit 240, and the motor control unit 42 and engine control unit 32 which have been described above is principally constituted by a computer incorporating a central processing unit (CPU), a random-access memory (RAM), a read-only memory (ROM), and input and output portions. To the hybrid control unit 48, there are connected the brake control unit 240, the motor control unit 42 and the engine control unit 32, such that data communications are available between the hybrid control unit 48 and the brake control unit 240, motor control unit 42 and engine control unit 32. Since the understanding of the engine control unit 32 for controlling the engine 30 is not necessary to understanding the present invention, no description will be given regarding the data communication between the hybrid control unit 48 and the engine control unit 32, and the data communication between the hybrid control unit 48 and the brake control unit 240 and motor control unit 32 will be described to the extent necessary.

To the input portion of the brake control unit 240, there are connected the pressure sensors 140, 210, 211, 212–218 and the stroke sensors 220, 221. To the output portion of the brake control unit 240, there are connected the solenoid coils of the solenoid-operated shut-off valves 150, 152, 158, 160, 162, and the solenoid coils 188 of the linear valve devices 56–62. The brake control unit 240 and linear valve devices 56–62 constitute a major portion of a brake-cylinder-pressure control device for controlling the fluid pressures in the wheel brake cylinders 52, 54, 66, 68. To the hybrid control device 48, there is connected the battery 36, so that the hybrid control device 48 obtains data indicative of the charging capacity of the battery 36. The power converting device 40 is connected to the motor control unit 42.

The motor control unit 42 detects the operating speed and other operating condition of the electric motor 34, through the power converting device 40, and controls the electric motor 34 through the power converting device 40. The motor control unit 42 supplies the hybrid control unit 48 with data indicative of the operating speed and other operating condition of the electric motor 34, and the hybrid control unit 48 supplies the motor control unit 42 with data indicative of the desired torque of the electric motor 34. The desired torque of the electric motor 34 may be either a desired regenerative braking torque or a desired drive torque.

The brake control unit 240 supplies the hybrid control unit 48 with data indicative of the desired regenerative braking torque, and the hybrid control unit 48 supplies the brake control unit 240 with data indicative of the actually detected regenerative braking torque, data indicative of the operating state of the electric motor, and data indicative of the amount of electric energy stored in the battery 36.

The data communications between the hybrid control unit 48 and the other control units 240, 42, 32 are effected such that a data request signal is fed from one control unit to the other control unit, and appropriate data are transmitted from one of the control units to the other control unit in response to a request signal sent from this other control unit to the above-indicated one control unit. Alternatively, each control unit has various kinds of data stored in its output portion, so that these data can be accessed and read out from the other control units.

The hydraulic braking device 50 is diagnosed for any abnormality or defect when the ignition switch of the vehicle is turned on, or when the vehicle is stationary, for instance.

The operation of the braking system constructed as described above will be described.

In a normal braking operation initiated with an operation of the brake pedal 96, the solenoid-operated shut-off valves 152, 161 are closed to disconnect the wheel brake cylinders 52, 54, 66, 68 from the second hydraulic pressure source 72. In this state, the amounts of electric current to be applied to the solenoid coils 188 of the linear valve devices 56, 58, 60, 62 are controlled to regulate the pressure of the pressurized fluid delivered from the first hydraulic pressure source 72 to the wheel brake cylinders 52, 54, 66, 68.

The brake control unit 240 calculates the desired total braking torque on the basis of the stroke sensors 220, 221 and the output signals of the pressure sensors 210, 211, and obtains an electricity-generating upper limit and a battery-charging upper limit of the regenerative braking torque that can be generated by the electric motor 34. The electricity-generating upper limit is determined by the operating speed of the electric motor 34, and the battery-charging upper limit is determined by the charging capacity of the battery 36. The data indicative of those operating speed and charging capacity are received from the hybrid control unit 48. The brake control unit 240 selects as the desired regenerative braking torque the smallest one of the electricity-generating upper limit, the battery-charging upper limit and the desired total braking torque (which is an upper limit of the regenerative braking torque determined by the operating force of the brake pedal 72). The data indicative of the desired regenerative braking torque are supplied from the brake control unit 240 to the hybrid control unit 48.

The hybrid control unit 48 supplies the motor control unit 42 with the data indicative of the desired regenerative braking torque, and the motor control unit 42 commands the power converting device 40 to control the electric motor 34 such that the actual regenerative braking torque generated by the electric motor 34 and applied to the wheels 10, 12 is equal to the desired value.

The motor control unit 42 supplies the hybrid control unit 48 with data indicative of the actual operating speed and other operating condition of the electric motor 34. On the actual operating condition of the electric motor 34, the hybrid control unit 48 obtains the actual regenerative braking torque, and supplies the brake control unit 240 with data indicative of the actual regenerative braking torque.

The brake control unit 240 controls the linear valve devices 56, 62 so that a braking torque which is a difference between the vehicle operator's desired total braking torque and the actual regenerative braking torque is generated by the hydraulic braking device 50. Namely, the braking torque obtained by subtracting the actual regenerative braking torque from the desired total or vehicle braking torque is determined as a desired hydraulic braking torque, and the amount of electric current to be applied to the solenoid coil 188 is controlled so that the fluid pressure in the corresponding wheel brake cylinder 52, 54, 66, 68 coincides with a desired value corresponding to the desired hydraulic braking torque. This control of the braking system is referred to as a "cooperative control" of the hydraulic braking device 50 and the electric motor 34 wherein a sum of the regenerative braking torque generated by the electric motor 34 and the hydraulic braking torque generated by the hydraulic braking device 50 is equal to the desired total braking torque. The cooperative control permits the vehicle to be braked at a deceleration value desired by the vehicle operator.

Where a defect is found of the first hydraulic pressure source 70 (except the accumulator 76), linear valve devices 56–62, brake control unit 240 and other elements of the brake-cylinder-pressure control device, the brake control unit 240 supplies the hybrid control unit 48 with data indicating that the desired regenerative braking torque is zero, so that the actual regenerative braking torque is zeroed, since the hydraulic braking torque cannot be normally controlled. The above-indicated defect of the hydraulic braking device 50 may be a failure of the pump device 74 (a failure of the electric motor 138), an abnormality (excessive voltage drop) of the electric power source for operating the linear valve devices 56–62 or electric motor 138), an abnormality of the linear valve devices 56–62, an abnormality of the brake control unit 240, and other elements of the brake-cylinder-pressure control device or an abnormality of the pressure sensors 140, 310, 211, 212–218. In the event of any one of those defects or abnormalities, the solenoid-operated control valves 152, 154, 158, 162, 164, 172, 176 and the electric motor 34 are not supplied with an electric energy to prevent the cooperative control indicated above. Any of those defects will be simply referred to as a defect of the dynamic pressure system.

Since the solenoid coils of the solenoid-operated shut-off valves 152, 154, 162, 164 are in the de-energized state, the shut-off valves 152, 162 are placed in the open state, and the shut-off valves 154, 164 are also placed in the open state, so that the wheel brake cylinders 52, 54, 66, 68 are held in communication with the second hydraulic pressure source 72. Since the solenoid coil of the shut-off valve 158 is in the de-energized state, this shut-off valve 158 is placed in the closed state, so that the stroke simulator 156 is disconnected from the second hydraulic pressure source 72, for preventing the stroke simulator 156 from absorbing the pressurized fluid delivered from the second hydraulic pressure source 72, to minimize unnecessary consumption of the pressurized fluid. Since the solenoid coils 188 of the linear valve devices 56–62 are also in the de-energized state, the pressure-increasing linear valve 172 and the pressure-reducing linear valve 176 are both placed in the closed state, so that the wheel brake cylinders 52, 54, 66, 68 are disconnected from the first hydraulic pressure source 70.

When the brake pedal 96 is depressed, a fluid pressure corresponding to the operating force of the brake pedal 96 as boosted by the hydraulic booster 78 is generated by the second hydraulic pressure source 72, and is applied to the wheel brake cylinders 52, 54, 66, 68. Described more specifically, the pressurized fluid is delivered from the accumulator 76 of the first hydraulic pressure source 70 to the second hydraulic pressure source 72, so that the hydraulic booster 78 is operated with the pressurized fluid from the accumulator 76. Since the fluid pressurized by the pump device 74 is stored in the accumulator 76 while the first hydraulic pressure source 70 is normal, the hydraulic booster 78 can be operated with the pressurized fluid delivered from the accumulator 76 even when the pump device 74 of the first hydraulic pressure source 70 fails to operate.

Accordingly, even though the regenerative braking torque is zeroed as indicated above when the first hydraulic pressure source 70 is defective, the hydraulic braking device 50 is capable of generating a braking torque corresponding to the operating force of the brake pedal 96 as boosted by the hydraulic booster 78, reducing a change in the braking force which is unexpected to the vehicle operator.

The hydraulic braking device 50 is designed such that the amount of electric energy consumed by the hydraulic braking device 50 is smaller than that consumed by the drive assembly 18. This design makes it possible to enable the pump device 74 to operate during running of the vehicle under some condition, even when the voltage of the battery 36 is lowered. In this case, the hydraulic booster 78 can be operated with the fluid pressurized by the pump device 74.

In the present embodiment, the accumulator 76 has a considerably large capacity, namely, is capable of accommodating an amount of hydraulic energy which is large enough to operate the hydraulic booster 78 a relatively large number of times corresponding to respective operations of the brake pedal 96, for example, 40 operations of the brake pedal 96, even while the pump device 74 is inoperable to pressurize the fluid in the accumulator 76. Where an indicator is provided to inform the vehicle operator of a detected defect of the pump device 74, for example, the vehicle can be braked as needed during running of the vehicle to a suitable place for repairing the pump device 74.

In the present embodiment wherein the first and second hydraulic pressure sources 70 and 72 use the common accumulator 76, the hydraulic braking device 50 is available at a lower cost and can be made smaller in size, than in a hydraulic braking system wherein two hydraulic pressure sources are provided for the respective first and second hydraulic pressure sources.

When the pressure of the fluid accumulated in the accumulator 78 is lowered to a level at which the hydraulic booster 78 is not operable, the second hydraulic pressure source 72 operates merely as a master cylinder. Namely, the pressurizing piston 84 is advanced by the operating force acting on the brake pedal 96, and the fluid pressure in the pressurizing chamber 86 is increased, so that the wheel brake cylinders 52, 54 for the front wheels 10, 12 are supplied with the pressurized fluid received from the pressurizing chamber 86.

Although the stroke simulator 200 is provided in the operating rod 88 in the present embodiment, the provision of the stroke simulator 200 is not essential, provided the stroke simulator 156 is provided.

In the present embodiment, the linear valve devices 56, 58, 60, 62 are provided for the respective wheel brake cylinders 52, 54, 66, 68, only one linear valve device may be provided commonly for the four wheel brake cylinders 56–62.

There is known a hydraulic braking device wherein only one linear valve device is provided for four wheel brake cylinders. In this linear valve device, the working fluid discharged through the pressure-reducing linear valve is not returned to a master reservoir but is returned to a pressure-reducing reservoir which is exclusively provided for reducing the fluid pressure in the wheel brake cylinders. Accordingly, the fluid pressure in the wheel brake cylinders may be increased when the fluid once returned to the pressure-reducing reservoir is returned to the master reservoir. In this event, the vehicle braking torque is larger than the desired total braking torque desired by the vehicle operator (the vehicle braking torque is increased unexpectedly to the vehicle operator), and the vehicle operator is likely to reduce the operating force of the brake pedal 96, so that the regenerative braking torque is reduced, and the energy efficiency is lowered. In the present embodiment, however, the fluid discharged through the pressure-reducing linear valve 176 is returned directly to the master reservoir 108, so that the energy efficiency can be reduced.

It is noted that the linear valve devices 56–62 may be replaced by a plurality of solenoid-operated shut-off valves. Further, the manner of data communications between the hybrid control unit 48 and the brake control unit 240, engine control unit 32 and motor control unit 42 is not limited to that described above.

In the present embodiment, the solenoid-operated shut-off valves 152, 162 are operated to selective connect and disconnect the wheel brake cylinders 52, 54, 66, 68 to and from the second hydraulic pressure source 72. However, the solenoid-operated shut-off valves 152, 162 may be replaced by a change valve disposed between the first and second hydraulic pressure sources 70, 72. This change valve may be adapted to connect the wheel brake cylinders 52, 54, 66, 68 to the first hydraulic pressure source 70 while disconnecting them from the second hydraulic pressure source 72 while the fluid pressure in the first hydraulic pressure source 70 is higher than a predetermined threshold, and connect the wheel brake cylinders 52, 54, 66, 68 to the second hydraulic pressure source 72 while the fluid pressure in the first hydraulic pressure source 70 is not higher than the threshold.

While the first hydraulic pressure source 70 is provided with the pressure sensor 140, this pressure sensor may be replaced by a plurality of pressure switches.

The hydraulic braking device 50 constructed as described above may be modified as shown in FIG. 4.

Figure 4:
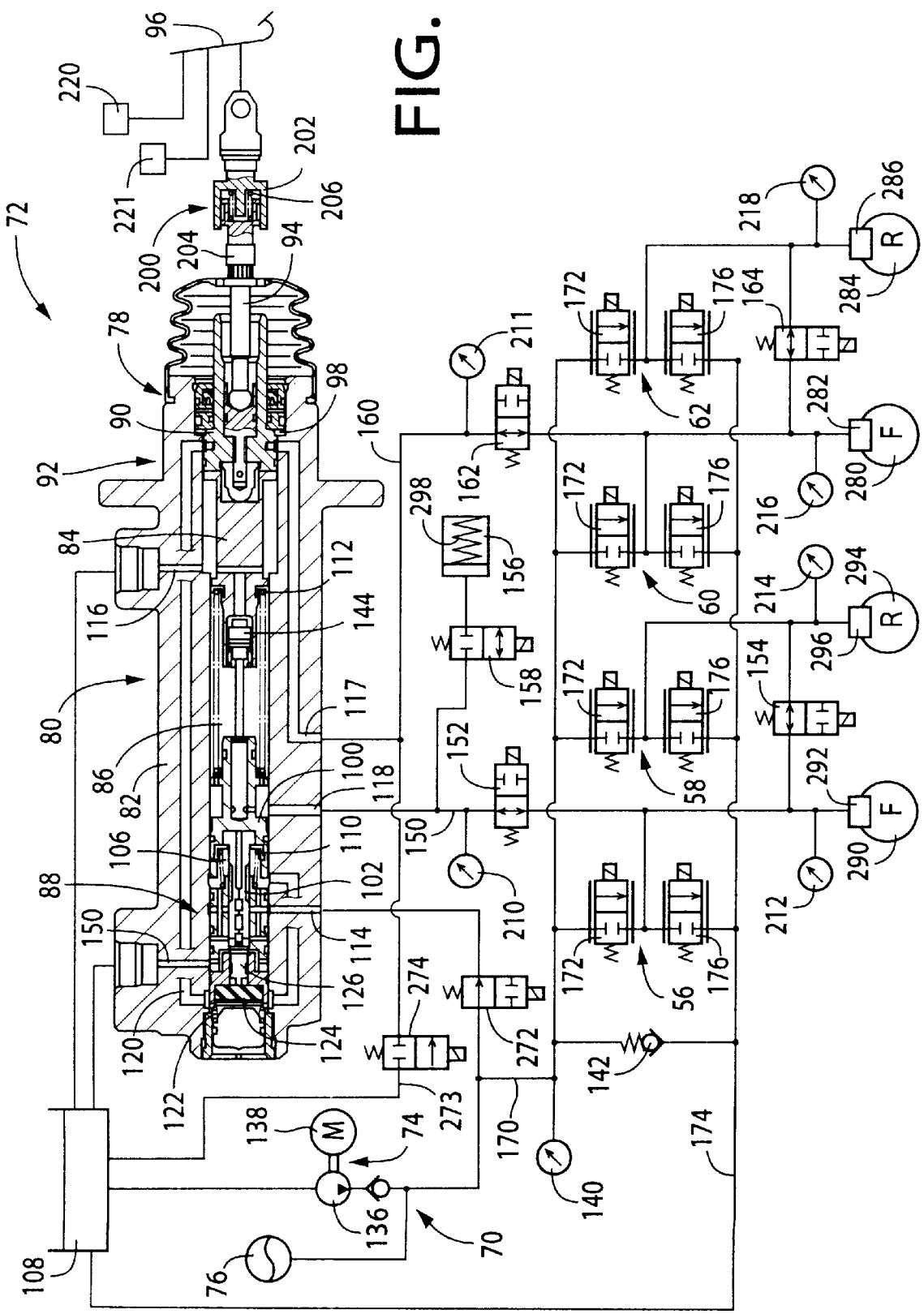
FIG. 4 is a hydraulic circuit diagram showing a hydraulic braking device included in a braking system according to another embodiment of the invention.

In the hydraulic braking device of FIG. 4, a solenoid-operated shut-off valve 272 is provided between the first hydraulic pressure source 70 and the high-pressure port 114. Further, the brake-port 117 communicating with the booster chamber 98 is connected to the master reservoir 108 through a fluid passage 273, which is provided with a solenoid-operated shut-off valve 274. In addition, the hydraulic braking device according to the present second embodiment is of a diagonal or X-crossing type. That is, a wheel brake cylinder 282 for a front right wheel 280 and a wheel brake cylinder 286 for a rear left wheel 284 are connected to the booster chamber 98, while a wheel brake cylinder 292 for a front left wheel 290 and a wheel brake cylinder 296 for a rear right wheel 294 are connected to the pressurizing chamber 86.

In a normal braking operation with the brake pedal 96 being operated, the solenoid-operated shut-off valve 272 is in the closed state while the solenoid-operated shut-off valve 274 is in the open state, so that the pressurized fluid is inhibited from being supplied from the first hydraulic pressure source 70 to the second hydraulic pressure source 72, to inhibit a boosting action of the hydraulic booster 78. The power piston 90 is advanced with the operating force of the brake pedal 96, and the fluid is supplied from the master reservoir 108 through the fluid passage 273 to the booster chamber 98, so as to prevent the fluid pressure in the booster chamber 98 from being lowered below the atmospheric pressure. If the solenoid-operated shut-off valve 272 were not provided, the pressure regulating chamber 106 would be disconnected from the low-pressure port 115 and connected to the high-pressure port 114, when the spool 102 is advanced with the pressurizing piston 84. In this case, the pressurized fluid would be supplied from the first hydraulic pressure source 70 to the booster chamber 98. In the present second embodiment, however, the pressurized fluid is not supplied from the first hydraulic pressure source 70 to the booster chamber 98, since the solenoid-operated shut-off valve 272 is normally placed in the closed state. Accordingly, the advancing movement of the power piston 90 may cause a negative fluid pressure in the booster chamber 98. In the present embodiment wherein the solenoid-operated shut-off valve 274 provided in the fluid passage 273 is normally placed in the open state, the fluid is supplied from the master reservoir 108 to the booster chamber 98 as the volume of the booster chamber 98 increases, whereby the fluid pressure in the booster chamber 98 is not lowered below the atmospheric level.

When a defect of the dynamic pressure system is detected, the solenoid-operated shut-off valves 272, 274 are brought to the original states, namely, to the open and closed states of FIG. 4, respectively. Since the shut-off valve 272 is open, the first hydraulic pressure source 70 (accumulator 76) is connected to the high-pressure port 114, so that the hydraulic booster 78 is enabled to operate. When the brake pedal 96 is operated in this condition, the fluid pressure in the pressurizing chamber 86 is increased to a value corresponding to the operating force of the brake pedal 96 as boosted by the hydraulic booster 78. At the same time, the fluid pressure regulated by the pressure regulating portion 88 is applied to the booster chamber 98, and the power piston 90 is advanced by a sum of the brake operating force and the boosting force. As the power piston 90 is advanced, the pressurized fluid is supplied from the pressure regulating chamber 106 to the booster chamber 98, so that the fluid pressure in the booster chamber 98 is not lowered below the atmospheric level even when the shut-off valve 274 is placed in the closed state.

In the present second embodiment, the hydraulic booster 78 is enabled to operate only when the first hydraulic pressure source 70 is defective. Accordingly, the required amount of energy consumption is reduced. Since the highly pressurized fluid is stored in the accumulator 76, the highly pressurized fluid can be rapidly supplied to the high-pressure port 114, when the shut-off valve 272 is opened. Thus, a delay in the boosting action of the booster 78 is reduced. When the dynamic pressure system is normal, the operation of the hydraulic booster 78 is inhibited, to prevent an unnecessary rise of the fluid pressure in the pressurizing chamber 86. When the hydraulic booster 78 is enabled to operate while the dynamic pressure system is normal, the fluid pressure in the pressurizing chamber 86 is increased, but the pressurized fluid is not accommodated in the stroke simulator 156 since the shut-off valve 158 is closed. Accordingly, a preset load of the spring 298 in the stroke simulator 156 can be made relatively small, and the stroke simulator 156 can be small-sized.

In the present second embodiment, the solenoid-operated shut-off valve 272 constitutes a major portion of a high-pressure-fluid supply control device for permitting a supply of the pressurized fluid from the first hydraulic pressure source 70 to the second hydraulic pressure source 72. The high-pressure-fluid supply control device also functions as an emergency enabling device for enabling the hydraulic booster 78 to operate when the dynamic pressure system is defective. The emergency enabling device may be considered to be an emergency activating device for activating the hydraulic booster 78 when the dynamic pressure system is defective.

Figure 5:
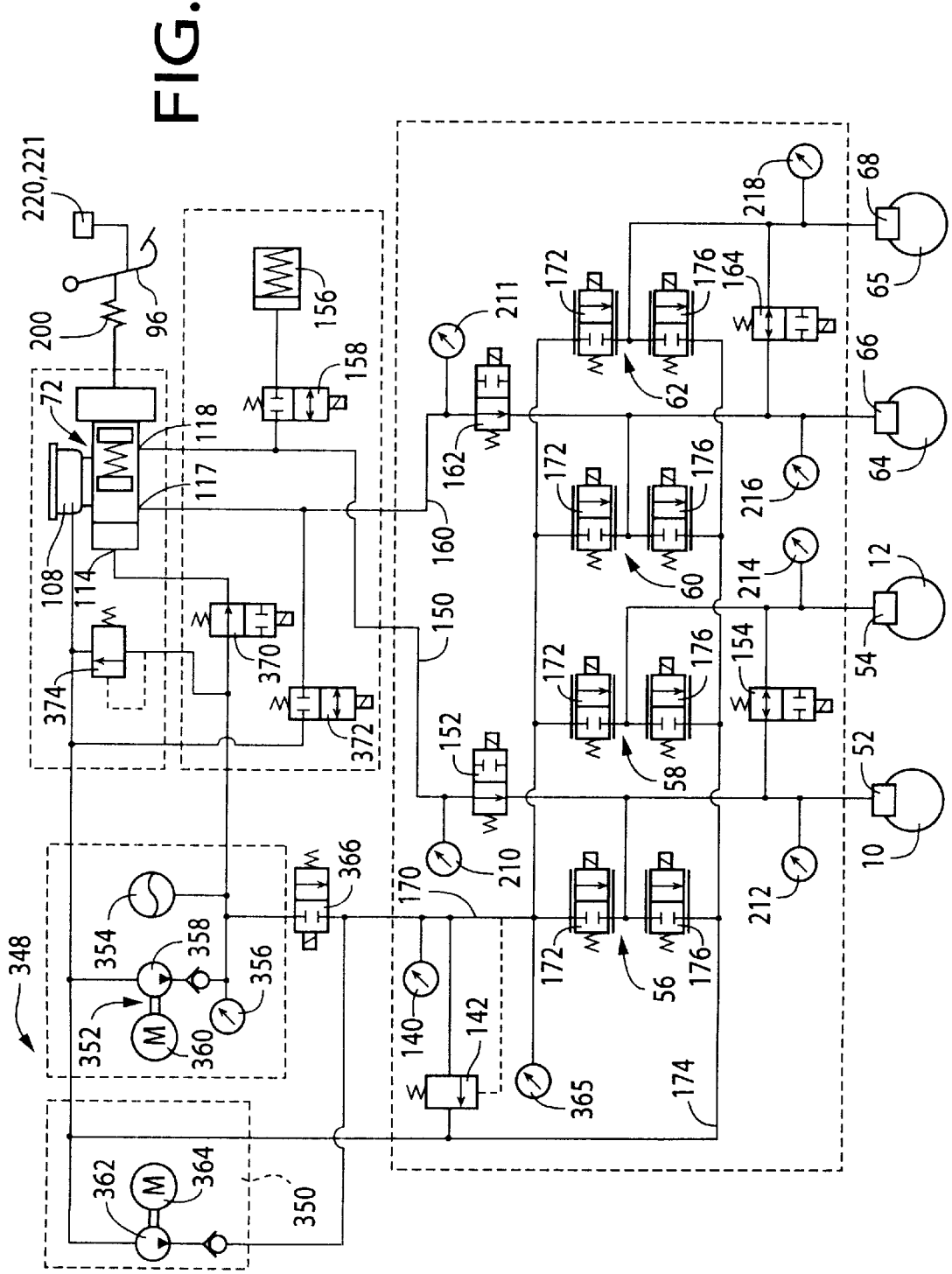
FIG. 5 is a hydraulic circuit diagram showing a hydraulic braking device included in a braking system according to a further embodiment of the invention.

The first hydraulic pressure source may include a plurality of pump devices, as in a third embodiment of this invention shown in FIG. 5. In the hydraulic braking device of FIG. 5, a first hydraulic pressure source 348 includes two pump devices 350, 352. The pump device 350 is adapted to deliver a pressurized fluid having a relatively low pressure, while the other pump device 352 is adapted to deliver a pressurized fluid having a relatively high pressure. In other words, the high-pressure pump device 352 has a higher maximum delivery pressure and a smaller delivery rate than the low-pressure pump device 350. An accumulator 354 is provided in communication with the high-pressure pump device 352. The fluid pressure in the accumulator 354 is detected by an accumulator pressure sensor 356. On the basis of the output signal of the accumulator pressure sensor 356, an electric motor 360 for driving a pump 358 of the high-pressure pump device 352 is controlled such that the fluid pressure in the accumulator 354 is held in a predetermined range.

In the present third embodiment, at least one of the pressurized fluid delivered from the low-pressure pump device 350 and the pressurized fluid delivered from the high-pressure pump device 352 is supplied to the wheel brake cylinders 52, 54, 66, 68, depending upon the desired hydraulic braking torque, a rate of change of the desired hydraulic braking torque, and other parameters. In a normal braking operation wherein the cooperative control is effected, the desired hydraulic braking torque is not so large. In most cases, therefore, the pressure of the pressurized fluid delivered from the low-pressure pump device 350 is controlled by the linear valve devices 56–62, and the thus controlled pressure is applied to the wheel brake cylinders 52, 54, 66, 68. The electric motor 364 is controlled on the basis of the output signal of the pressure sensor 140 so that the pressurized fluid delivered from the pump 362 of the pump device 350 coincides with the desired hydraulic braking torque. The pressure of the pressurized fluid delivered from the pump device 350 is detected by the pressure sensor 140. The fluid pressure on the high-pressure side of the pressure-increasing linear valve 172 is detected by a pressure sensor 365. The pressure differential force based on a pressure difference across the pressure-increasing linear valve 172 corresponds to a difference between the pressure detected by the pressure sensor 365 and the fluid pressure in the corresponding wheel brake cylinder 52, 54, 66, 68. Where the linear valve devices 56–62 are controlled on the basis of the fluid pressure directly detected by the pressure sensor 365 on the high-pressure side of the pressure-increasing linear valve 172, the linear valve devices 56–62 can be controlled with a higher degree of accuracy without an influence of a pressure loss between the pump device 350 and the linear valve devices 56–62, than where the linear valve devices are controlled on the basis of the fluid pressure detected by the pressure sensor 140. It is noted that both of the pressure sensors 140, 365 are not essential, and only one of these pressure sensors 140, 350 may be provided.

When the desired hydraulic braking torque becomes larger than a predetermined threshold, a solenoid-operated shut-off valve 366 disposed downstream of the high-pressure pump device 352 is switched from the closed state to the open state, so that the pressurized fluid delivered from the high-pressure pump device 352 is supplied to the wheel brake cylinders 52, 54, 66, 68. However, it is noted that the frequency of supply of the pressurized fluid from the high-pressure pump device 352 to the wheel brake cylinders is extremely low than that of the pressurized fluid delivered from the low-pressure pump device 350.

In view of a fact that the frequency of supply of the pressurized fluid delivered from the high-pressure pump device 352 to the wheel brake cylinders is comparatively low, the accumulator 354 is provided for storing the pressurized fluid delivered from the high-pressure pump device 352, so that a sufficient amount of the pressurized fluid (hydraulic energy) can be always stored in the accumulator 354.

The solenoid-operated shut-off valve 366 is opened when the pressurized fluid delivered from the high-pressure pump device 352 is supplied to the wheel brake cylinders 52, 54, 66, 68, and is held in the closed state in the other cases. While the shut-off valve 366 is in the closed state, the operation of the high-pressure pump device 352 does not have an influence on the control of the fluid pressures in the wheel brake cylinders, and the operating condition of the high-pressure pump device 352 can be controlled so as to store the highly pressurized fluid in the accumulator 354. In the closed state of the shut-off valve 366, the pressurized fluid delivered from the low-pressure pump device 350 is not supplied to the high-pressure pump device 352.

In the present third embodiment a solenoid-operated shut-off valve 370 is provided between the high-pressure pump device 352 and the high-pressure port 114 (hydraulic booster 78), and a solenoid-operated shut-off valve 372 is provided between the master reservoir 108 and the brake port 117 (booster chamber 98). When the dynamic pressure system is defective, that is, when the wheel brake cylinders 52, 54, 66, 68 are held in communication with the second hydraulic pressure source 72, the shut-off valve 370 is opened to enable the hydraulic booster 78 to operate, as in the second embodiment of FIG. 4. In the second hydraulic pressure source 72 in the third embodiment, the positions of the ports 117, 118 as shown in FIG. 5 are reversed with respect to those in the second embodiment of FIG. 4. This reversal is merely for convenience' sake in the drawing of FIG. 5. In this embodiment, too, the port 117 communicates with the booster chamber 98 while the port 118 communicates with the pressurizing chamber 86.

Further, a pressure relief valve 374 is provided between the delivery and suction sides of the high-pressure pump device 352, in order to prevent an excessive rise of the delivery pressure of the pump device 352.

As described above, the first hydraulic pressure source 348 in the third embodiment uses the two pump devices 350, 352, and the pressurized fluid delivered from the high-pressure pump device 352 is stored in the accumulator 354, since the frequency of supply of the pressurized fluid from the high-pressure pump device 352 to the wheel brake cylinders 52, 54, 66, 68 is lower than that of the pressurized fluid from the low-pressure pump device 350. This arrangement assures higher stability in storing the pressurized fluid in the accumulator 354, and permits a larger amount of hydraulic energy to be stored in the accumulator 354, than where the pressurized fluid delivered from the low-pressure pump 350 whose pressurized fluid is comparatively frequently supplied to the wheel brake cylinders is stored in the accumulator 354. Accordingly, the hydraulic booster 78 can be operated for a longer period of time after the wheel brake cylinders are communicated with the second hydraulic pressure source 72.

When the pressurized fluid delivered from the low-pressure pump device 350 is supplied to the wheel brake cylinders 52, 54, 66, 68, the delivery pressure and rate of the pump device 350 are controlled. Accordingly, the required frequency of operations of the linear valve devices 56–62 can be reduced, so that the accuracy of control of the wheel brake cylinder pressure can be improved. The wheel brake cylinder pressure can be controlled by controlling the delivery pressure of the first hydraulic pressure source 348, so that the linear valve devices 56–63 may be eliminated in some cases.

It is not essential to control the operating condition of the low-pressure pump device 350 on the basis of the desired hydraulic braking torque. Namely, the electric motor 364 for driving the pump 362 may be held in a predetermined operating state during brake application. Alternatively, the delivery pressure and rate of the pump 362 may be held at predetermined values during the brake application. It is also possible to control the wheel brake cylinder pressure by utilizing the pressurized fluid delivered from the high-pressure pump device 352 when the low-pressure pump device 350 is defective. In the present third embodiment, the accumulator 354 serves as an energy storing portion for storing a hydraulic energy.

In the embodiments described above, the accumulator of the first hydraulic pressure source for activating the wheel brake cylinders while the dynamic pressure system is normal is utilized as the accumulator for operating the second hydraulic pressure source while the dynamic pressure system is defective. However, different accumulators may be used for these two different purposes, respectively, as in a hydraulic braking device shown in FIG. 6 according to a fourth embodiment of this invention.

Figure 6:
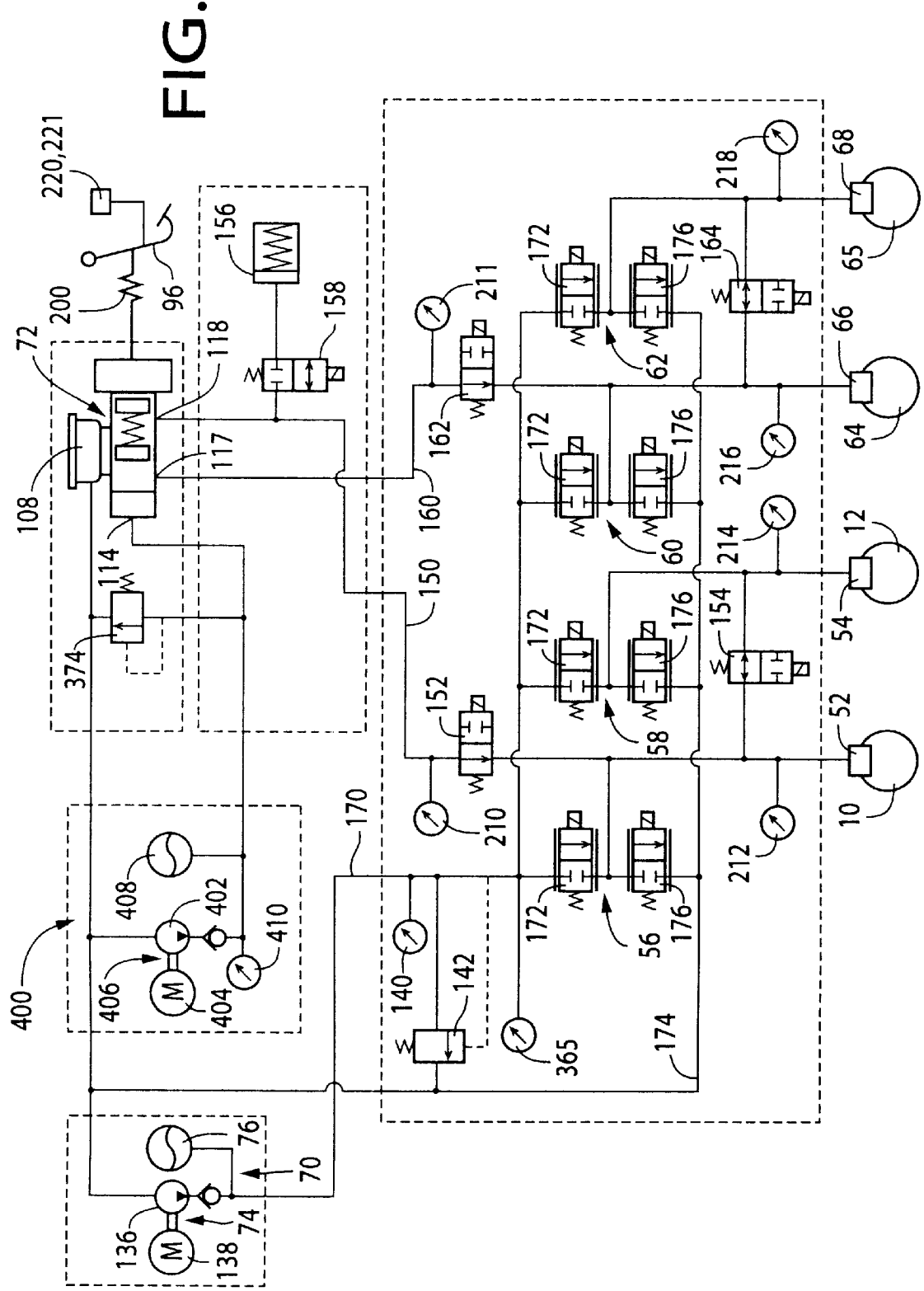
FIG. 6 is a hydraulic circuit diagram showing a hydraulic braking device included in a braking system according to a still further embodiment of the invention.

In the hydraulic braking device of FIG. 6, a hydraulic pressure source 400 is provided in addition to the first and second hydraulic pressure sources 70, 72. The first hydraulic pressure source 70 is used exclusively for activating the wheel brake cylinders 52, 54, 66, 68, and the hydraulic pressure source 400 is connected to the high-pressure port 114 of the second hydraulic pressure source 72.

The hydraulic pressure source 400 includes a pump device 406 and an accumulator 408. The pump device 406 includes a pump 402 and an electric motor 404. The electric motor 404 is controlled such that the fluid pressure in the accumulator 408 detected by an accumulator pressure sensor 410 is held within a predetermined range.

In the present fourth embodiment whereby the accumulator 408 is provided exclusively for operating the hydraulic booster 78 of the second hydraulic pressure source 72, the operating reliability of the hydraulic braking device is improved.

Figure 7:
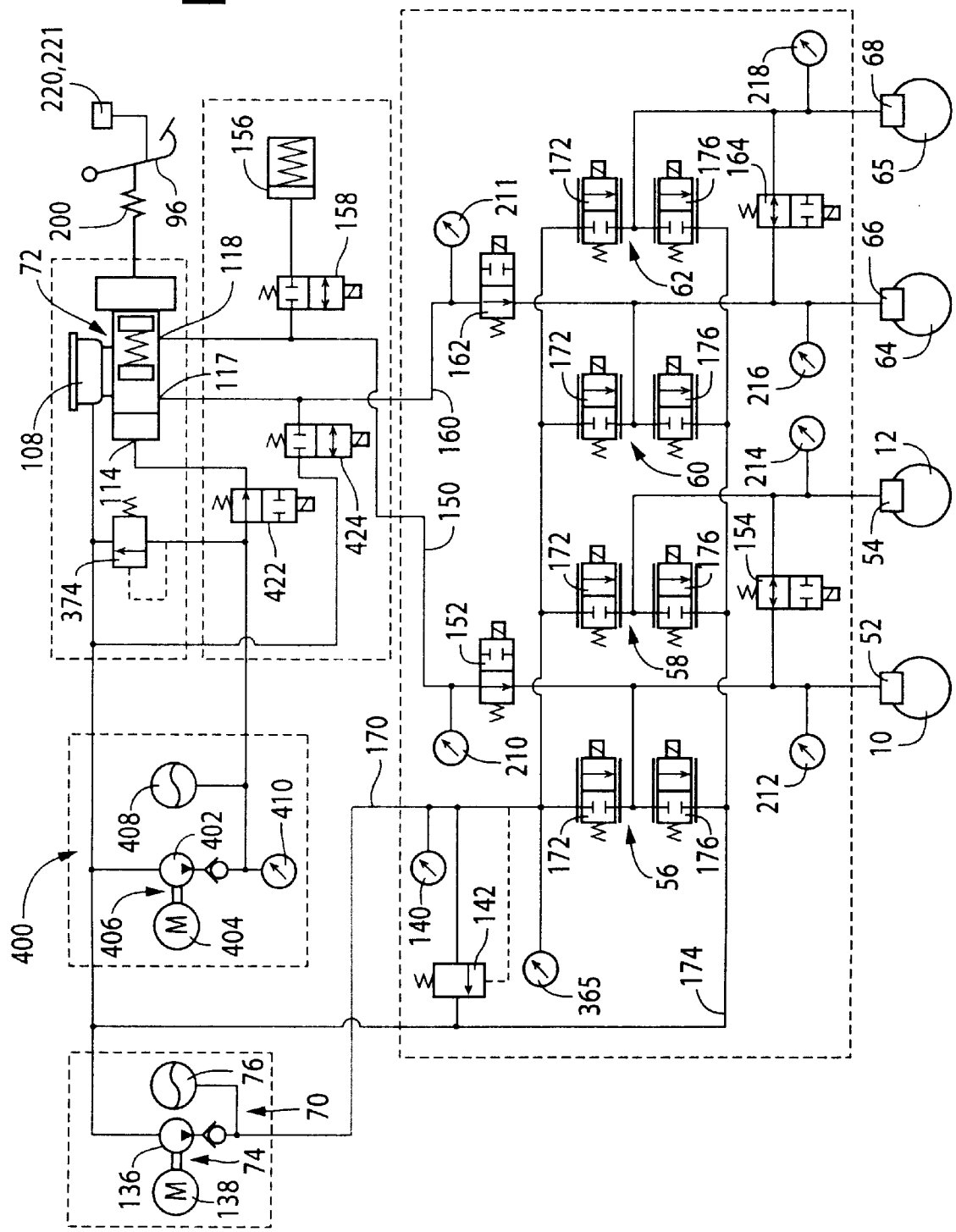
FIG. 7 is a hydraulic circuit diagram showing a hydraulic braking device included in a braking system according to yet further embodiment of the invention.

In the fourth embodiment, the hydraulic pressure source 400 is held in communication with the second hydraulic pressure source 72, so that the hydraulic booster 78 is held ready for operation with the highly pressurized fluid delivered from the hydraulic pressure source 400. However, the operation of the hydraulic booster 78 may be made ready only when the dynamic pressure system becomes defective, as in a fifth embodiment of FIG. 7. In this embodiment, a solenoid-operated shut-off valve 422 is provided between the hydraulic pressure source 400 and the high-pressure port 114, while a solenoid-operated shut-off valve 424 is provided between the master reservoir 108 and the brake port 117. These shut-off valves 422, 424 are controlled in the same manner as the shut-off valves 272, 274 of FIG. 4 and the shut-off valves 370, 372.

Figure 8:
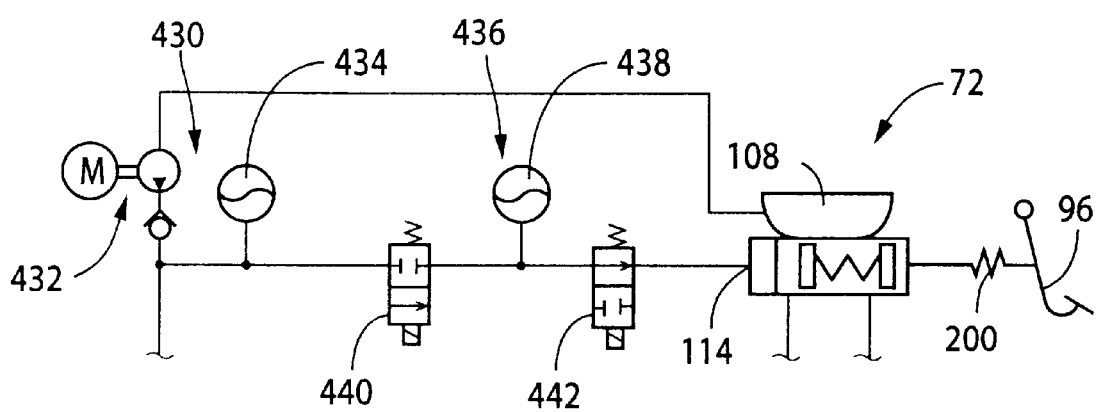
FIG. 8 is a view showing a hydraulic braking device included in a braking system according to still another embodiment of this invention.

While the first hydraulic pressure source 70 and the hydraulic pressure source 400 include the respective pump devices 74, 406, both of the hydraulic pressure sources 70, 400 need not use the respective pump devices, but may use a common pump device (pump and pump motor), as in a sixth embodiment of FIG. 8.

In the sixth embodiment of FIG. 8, a first hydraulic pressure source 430 include a pump device 432 and an accumulator 434, and a hydraulic pressure source 436 for the hydraulic booster 78 includes only an accumulator 438 and does not use a pump device.

In the present embodiment, the two accumulators 434, 438 are connected to the single pump device 432, so that the pressurized fluid delivered from the pump device 432 is stored in both of the accumulators 434, 438. Between these two accumulators 434, 438, there is provided a switch valve in the form of a solenoid-operated shut-off valve 440, while a solenoid-operated shut-off valve 442 is provided between the accumulator 438 and the high-pressure port 114.

When the pump device 432 and the linear valve devices 56–62 are normal, the shut-off valve 440 is in the open state while the shut-off valve 42 is in the closed state. In this condition, the highly pressurized fluid delivered from the pump device 432 is stored in both of the accumulators 434, 438. Since the shut-off valve 442 is in the closed state, the pressurized fluid is not supplied to the second hydraulic pressure source 70, so that the operation of the hydraulic booster 78 is inhibited.

When a defect of the dynamic pressure system is detected, the shut-off valve 440 is closed, and the shut-off valve 442 is opened, so that the hydraulic booster 78 is enabled to operate with the pressurized fluid received from the accumulator 438. In this condition wherein the solenoid-operated shut-off valve 440 is placed in the closed state, the pressurized fluid delivered from the accumulator 438 is prevented from being unnecessarily supplied to the wheel brake cylinders through the first hydraulic pressure source 430 and the brake-cylinder-pressure control device. Where the pressure-reducing linear valve 172 of the linear valve device 56, 58, 60, 62 is defective and cannot be switched from the open state to the closed state, for instance, the pressurized fluid delivered from the accumulator 438 is supplied to the corresponding wheel brake cylinder through the defective pressure-reducing linear valve 172 remaining in the open state.

In the present sixth embodiment wherein the single pump device 432 is used for the two accumulators 434, 438, the hydraulic braking device can be small-sized and is available at a comparatively low cost.

Figure 9:
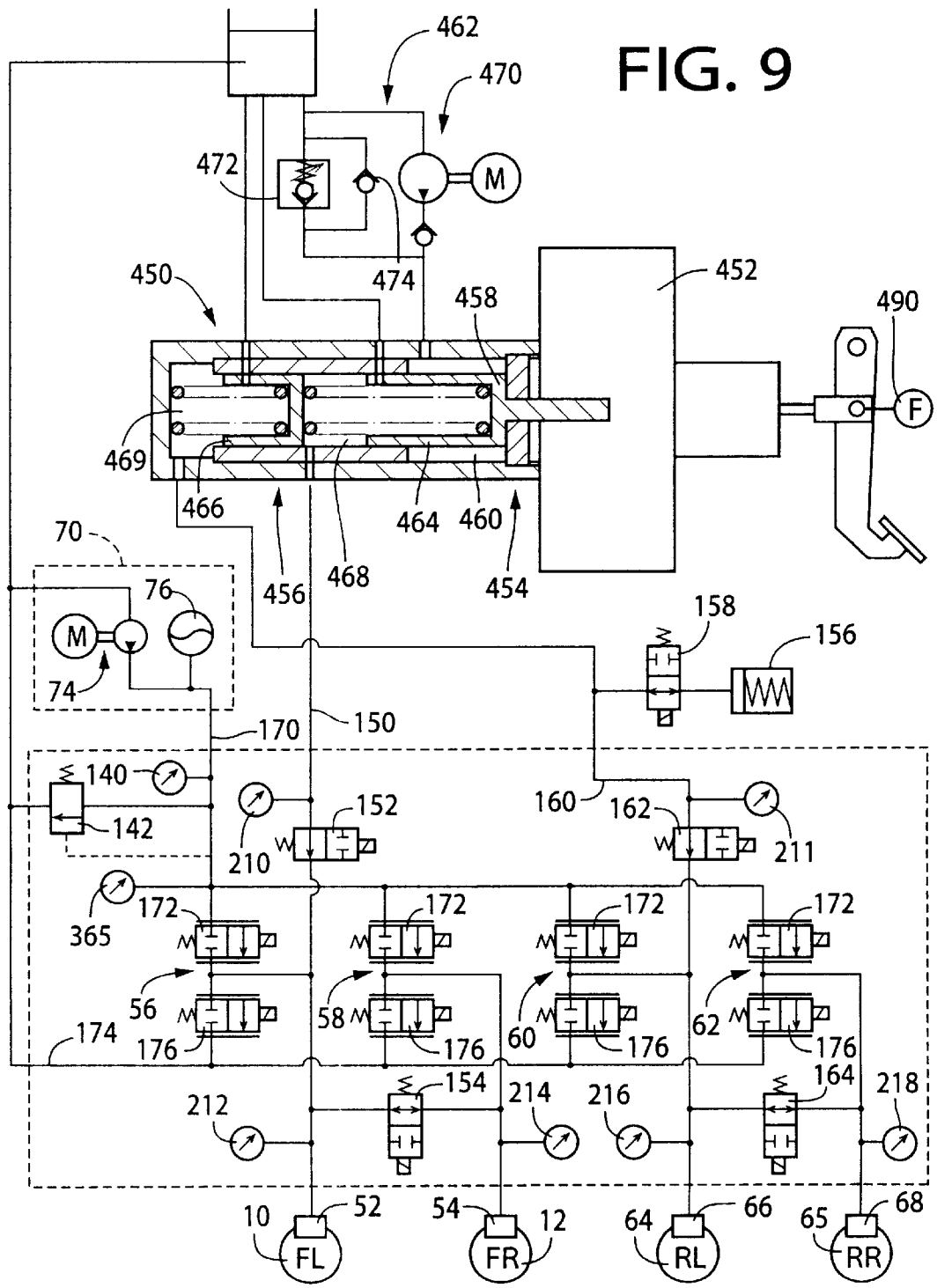
FIG. 9 is a hydraulic circuit diagram showing a hydraulic braking device included in a braking system according to yet another embodiment of the invention.

The arrangement of the second hydraulic pressure source is not limited to that of the second hydraulic pressure source 70 in the foregoing embodiments, but may be modified as shown in FIG. 9 by way of example. In the hydraulic braking device of FIG. 9 according to a seventh embodiment of the invention, a second hydraulic pressure source 450 includes a vacuum booster 452, a hydraulic booster 454, and a master cylinder 456, which are arranged in series with each other. The operating force acting on the brake pedal is first boosted by the vacuum booster 452, and is further boosted by the hydraulic booster 454.

The hydraulic booster 454 includes a power piston 458 operatively connected to the output shaft of the vacuum booster 452, and a solenoid-operated pressure control device 462 associated with a booster chamber 460 which is partially defined by the power piston 458. The fluid pressure in the booster chamber 460 is controlled by the solenoid-operated pressure control device 462, to control the boosting force acting on the power piston 458. Thus, the boosting ratio of the hydraulic booster 454 is electrically controlled.

The master cylinder 456 includes two pressurizing pistons 464, 466, and the pressurizing piston 464 is formed integrally with the power piston 458 of the hydraulic booster 454. The pressurizing piston 464 may be considered to have a rear portion which serves as the power piston 458. The pressurizing piston 464 partially define a pressurizing chamber 468 on its front side remote from the power piston 458, while the pressurizing piston 466 partially defines a pressurizing chamber 469 on its front side remote from the pressurizing chamber 468. The pressurizing chamber 468 is connected to the front wheel brake cylinders 52, 54, while the pressurizing chamber 469 is connected to the rear wheel brake cylinders 66, 68.

The solenoid-operated pressure control device 462 includes a pump device 470, a pressure control valve 472 capable of controlling the fluid pressure in the booster chamber 460, and a check valve 474. The pump device 470 includes a pump and an electric motor for driving the pump.

Figure 10A:
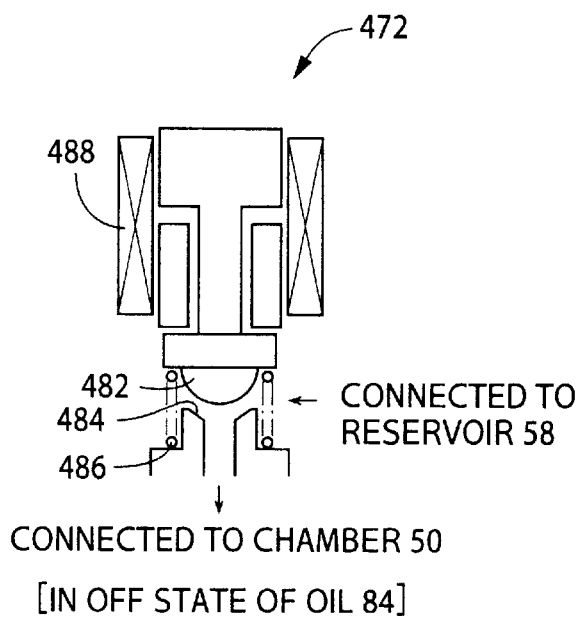
FIGS. 10A and 10B are schematic views showing a pressure control valve included in the hydraulic braking device of FIG. 9.
Figure 10B:
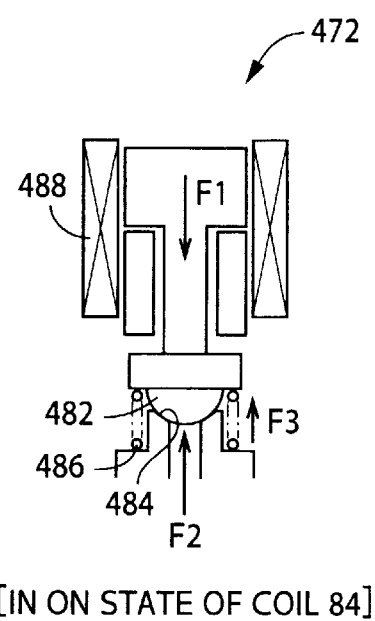
Figure 11:
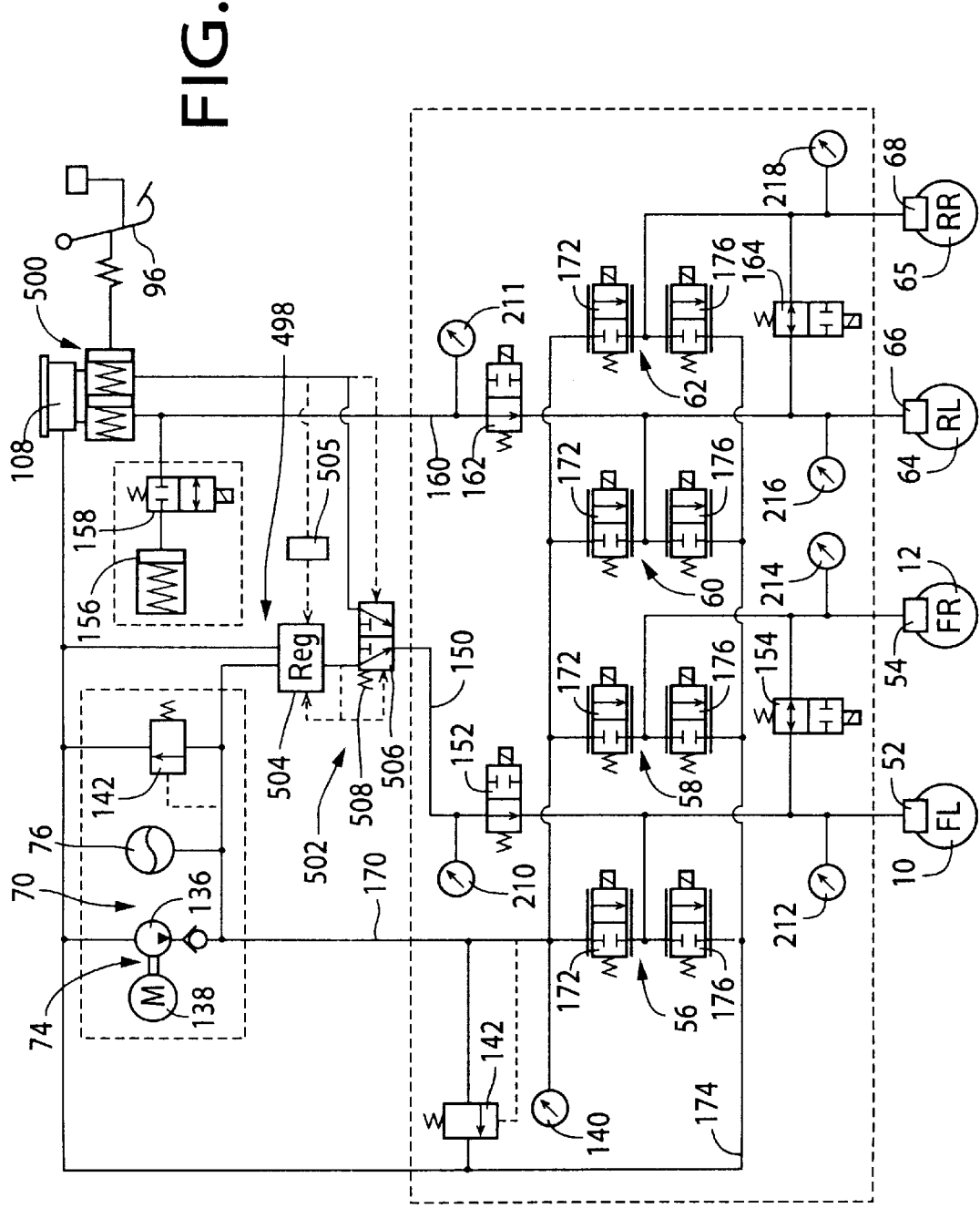
FIG. 11 is a hydraulic circuit diagram showing a hydraulic braking device included in a braking system according to a further embodiment of the invention.

As shown in FIGS. 10A and 10Bm the pressure control valve 472 includes a valve member 482, a valve seat 484, a spring 486, and a solenoid coil 488. This pressure control valve 472 is a normally open valve wherein the valve member 482 is held apart from the valve seat 484 when no electric current is applied to the solenoid coil 488. When an electric current is applied to the solenoid coil 488, the valve member 482 receives an electromagnetic drive force F1 corresponding to an amount of electric current applied to the coil 488, a hydraulic force F2 corresponding to the fluid pressure in the booster chamber 460, and an elastic force F3 of the spring 486. The hydraulic force F2 and the elastic force F3 act on the valve member 482 in a first direction for moving the valve member 482 away from the valve seat 484, while the electromagnetic force F1 acts on the valve member 482 in a second direction opposite to the first direction. The position of the valve member 482 relative to the valve seat 484 is determined by the forces F1, F2 and F3, and the fluid pressure in the booster chamber 460 can be controlled by controlling the amount of electric current to be applied to the solenoid coil 488, whereby the boosting ratio of the hydraulic booster 454

The hydraulic booster 454 can be operated even if the dynamic pressure system is defective, provided the solenoid-operated pressure control valve device 462. Further, since the fluid pressure in the booster chamber 460 can be controlled, the fluid pressure in the wheel brake cylinders 52, 54, 66, 68 can be controlled even when the linear valve devices 56–62 can be controlled. In the present seventh embodiment wherein an operating-force sensor 490 is provided for detecting the operating force of the brake pedal 96, the desired total braking torque can be obtained on the basis of the output signal of the operating-force sensor 490. It will be understood that the hydraulic braking device according to the present embodiment does not use an energy storing portion for storing a hydraulic energy for operating the hydraulic booster 454 when the dynamic pressure system (e.g., pump device 74 of the first hydraulic pressure source 70) is defective.

When the solenoid-operated pressure control device 462 is defective, the fluid is supplied from the master reservoir 108 to the booster chamber 460 through the check valve 464 and the pressure control valve 472 in the open state, to prevent a negative fluid pressure in the booster chamber 460 during an operation of the brake pedal 96. In this event, the fluid pressure in the pressurizing chambers 468, 469 is pressurized to a value corresponding to the brake operating force as boosted by the vacuum booster 452.

The solenoid-operated pressure control device 462 may be provided with an accumulator.

The second hydraulic pressure source need not include a hydraulic booster. In the hydraulic braking device according to an eighth embodiment of the invention shown in FIG. 8, a second hydraulic pressure source 498 includes a master cylinder 500, and a pressure increasing device 502 in place of a hydraulic booster. The master cylinder 500 is of a tandem type having two pressurizing chambers, and is adapted to generate in the two pressurizing chambers a fluid pressure which corresponds to the operating force acting on the brake pedal 96. The two pressurizing chambers are connected to the wheel brake cylinders 52, 54, 66, 68. The pressure increasing device 502 includes a pressure regulating valve 504, a pressure increasing unit 505, and a communication switching valve 506. The pressure increasing device 502 is adapted to increase the fluid pressure in the master cylinder 500 by utilizing the pressurized fluid delivered from the first hydraulic pressure source 70, and supply the fluid of the increased pressure to the front wheel brake cylinders 52, 54.

Figure 12:
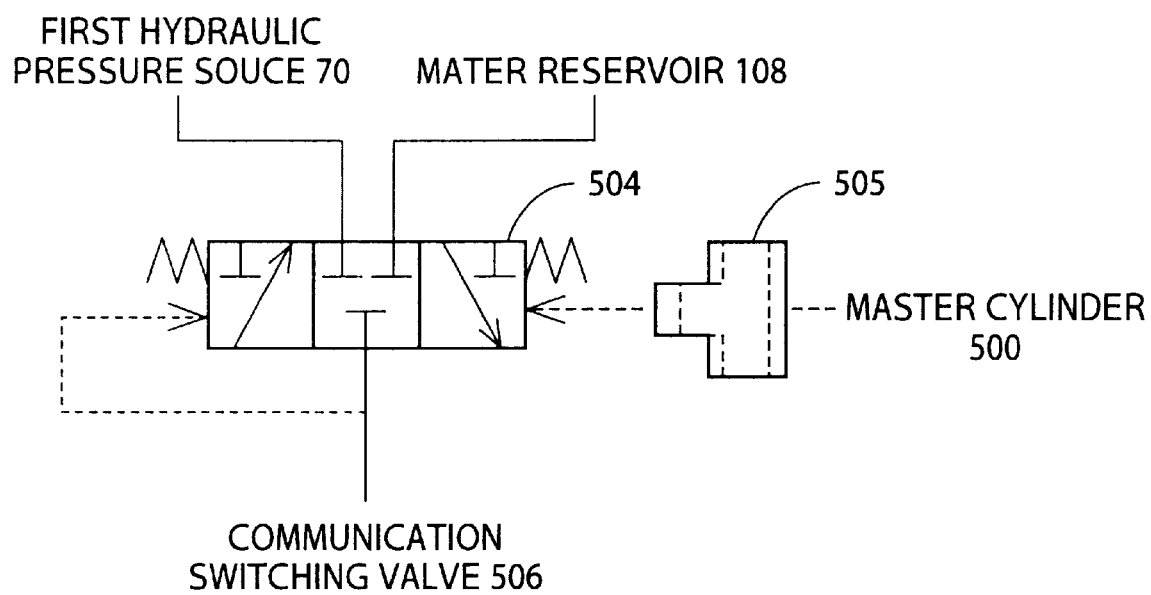
FIG. 12 is a view showing a pressure-increasing device included in the hydraulic braking device of FIG. 11.

To the pressure regulating valve 504, there is connected a pressure increasing unit 505 which includes a stepped cylinder, and a stepped piston fluid-tightly and slidably fitted in the stepped cylinder, as shown in FIG. 12. The pressure increasing unit 505 is adapted to mechanically increase the fluid pressure in the master cylinder 500, which fluid pressure corresponds to the operating force of the brake pedal 96. The pressure regulating valve 504 is mechanically operated on the basis of the master cylinder pressure as increased by the pressure increasing unit 505, and the output pressure of the pressure increasing unit 505 per se. When the master cylinder pressure as increased by the pressure increasing unit 505 becomes higher than the output pressure of the pressure regulating device 504, this pressure regulating device 504 is switched to a position for fluid communication of the wheel brake cylinders 52, 54 to the first hydraulic pressure source 70. When the maser cylinder pressure as boosted by the pressure increasing unit 505 becomes lower than the output pressure, the pressure regulating device 504 is switched to a position for fluid communication of the wheel brake cylinders 52, 52 with the master reservoir 108. In this manner, the output pressure of the pressure regulating device 504 is controlled to a value corresponding to the brake operating force.

The communication switching valve 506 has a spring 508, and is mechanically switched between a first position and a second position thereof, on the basis of the output pressure of the pressure regulating valve 504 as compared with the master cylinder pressure. When the output pressure of the pressure regulating valve 504 is higher than the master cylinder pressure, that is, when a sum of a force corresponding to the output pressure and an elastic force of the spring 508 is larger than a force corresponding to the master cylinder pressure, the communication switching valve 506 is switched to the first position for fluid communication of the wheel brake cylinders 52, 54 with the pressure regulating valve 504. When the master cylinder pressure becomes higher than the output pressure of the pressure regulating valve 504, the communication switching valve 506 is switched to the second position for fluid communication of the master cylinder 500. Therefore, when the master cylinder pressure becomes higher than the output pressure due to a drop of the fluid pressure in the accumulator 78, the communication switching valve 506 is switched to the second position for fluid communication of the wheel brake cylinders 52, 54 with the master cylinder 500. The communication switching valve 506 is switched from the first position to the second position also when the master cylinder pressure is increased by an operation of the brake pedal 96 to a value higher than the output pressure of the pressure regulating valve 504. In this case, too, the wheel brake cylinders 52, 54 are communicated with the master cylinder 500.

When a defect of the dynamic pressure system is detected, the fluid pressure in the master cylinder 500 as increased by the pressure increasing device 502 is applied to the wheel brake cylinders 52, 54. Namely, the pressure increasing device 502 is operated with the pressurized fluid stored in the accumulator 76. This arrangement is effective to reduce the amount of unexpected change of the vehicle braking force corresponding to a given brake operating force, which unexpected change takes place due to the defect of the dynamic pressure system.

The construction of the communication switching valve 506 is not limited to that described above. For instance, the communication switching valve 506 may be modified such that it is switched to the first position for fluid communication of the wheel brake cylinders 52, 54 with the pressure regulating valve 504 when the output pressure of the valve 504 is higher than a predetermined threshold, and to the second position for fluid communication of the wheel brake cylinders 52, 54 with the master cylinder 500 when the output pressure is lower than the threshold.

While the second hydraulic pressure source in each of the foregoing embodiments includes one of the hydraulic booster and the pressure increasing device, the second hydraulic pressure source may include both the hydraulic booster and the pressure increasing device. Further, the second hydraulic pressure source may include at least one of a booster and a pressure increasing device which are operated by an energy other than the hydraulic energy (pressurized working fluid).

Figure 13:
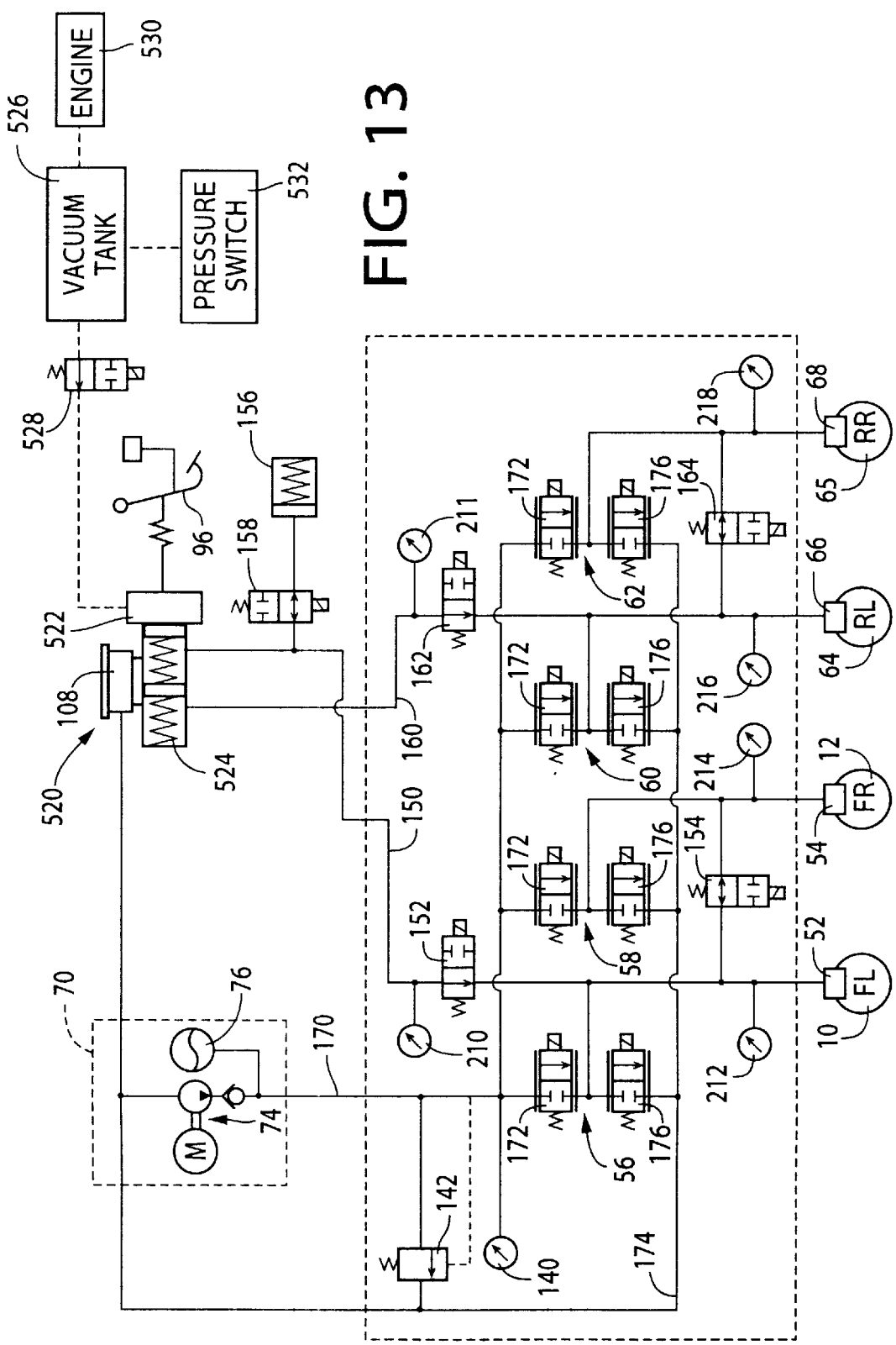
FIG. 13 is a hydraulic circuit diagram showing a hydraulic braking device included in a braking system according to a still further embodiment of the invention.

Referring next to FIG. 13, there is shown a hydraulic braking device according to a ninth embodiment of the present invention, wherein a second hydraulic pressure source 520 includes a vacuum booster 522 and a master cylinder 524. The vacuum booster 522 is adapted to boost the operating force of the brake pedal 96, and the boosted force is transmitted to the master cylinder 524.

In the present ninth embodiment of FIG. 13, a vacuum tank 526 is connected through a solenoid-operated shut-off valve 528 to the negative-pressure chamber of the vacuum booster 522. The shut-off valve 528 is a normally open valve, which is switched from its open state to its closed state when the solenoid coil is energized. When the solenoid coil is de-energized upon detection of a defect of the dynamic pressure system, the shut-off valve 528 is opened, so that the pressure in the negative-pressure chamber is lowered below the atmospheric level, and the vacuum booster 522 is enabled to operate. When the brake pedal 96 is operated, the vacuum booster 522 boosts the operating force of the brake pedal 96, according to a difference between the pressures in the negative-pressure chamber and the variable-pressure chamber. The boosted brake operating force is transmitted to the master cylinder 524.

The vacuum tank 526 is connected to an air intake system of an engine 530 of the vehicle, and stores a negative pressure as a result of an operation of the engine 530. The vacuum tank 526 is provided with a pressure switch 532, which is turned on when the pressure in the vacuum tank 526 becomes higher than a predetermined upper limit (lower than the atmospheric pressure). In this embodiment, the engine 530 is operated when the pressure in the vacuum tank 526 has exceeded the upper limit, so that the pressure in the vacuum tank 526 is maintained at a level not higher than the upper limit. In this respect, it is noted that the engine 530 in the hybrid vehicle is relatively frequently held at rest.

As described above, the second hydraulic pressure source 520 in the present hydraulic braking device includes the vacuum booster 522, which is operable irrespective of whether the dynamic pressure system (e.g., the pump deice 74 of the first hydraulic pressure source 70) is defective or not. That is, the vacuum booster 522 is operated with the negative pressure source in the form of the vacuum tank 526, which is different from the pump device 74 of the dynamic pressure system. Accordingly, the vacuum booster 522 can be operated even when the dynamic pressure system (first hydraulic pressure source 70 or the pressure control system 240, 56–62, etc.) is defective. The vacuum booster 522 is operated only when the dynamic pressure system is defective, amount of unnecessary consumption of an energy by the hydraulic braking system is avoided. Namely, the need of operating the engine 530 for the purpose of maintaining the negative pressure in the vacuum tank 526 below the upper limit can be reduced.

The vacuum booster 522 may be replaced by an air servo device operable with a difference between the atmospheric pressure and an air pressure higher than the atmospheric pressure.

The second hydraulic pressure source may includes an electrically operated booster operable with an electric energy.

Figure 14:
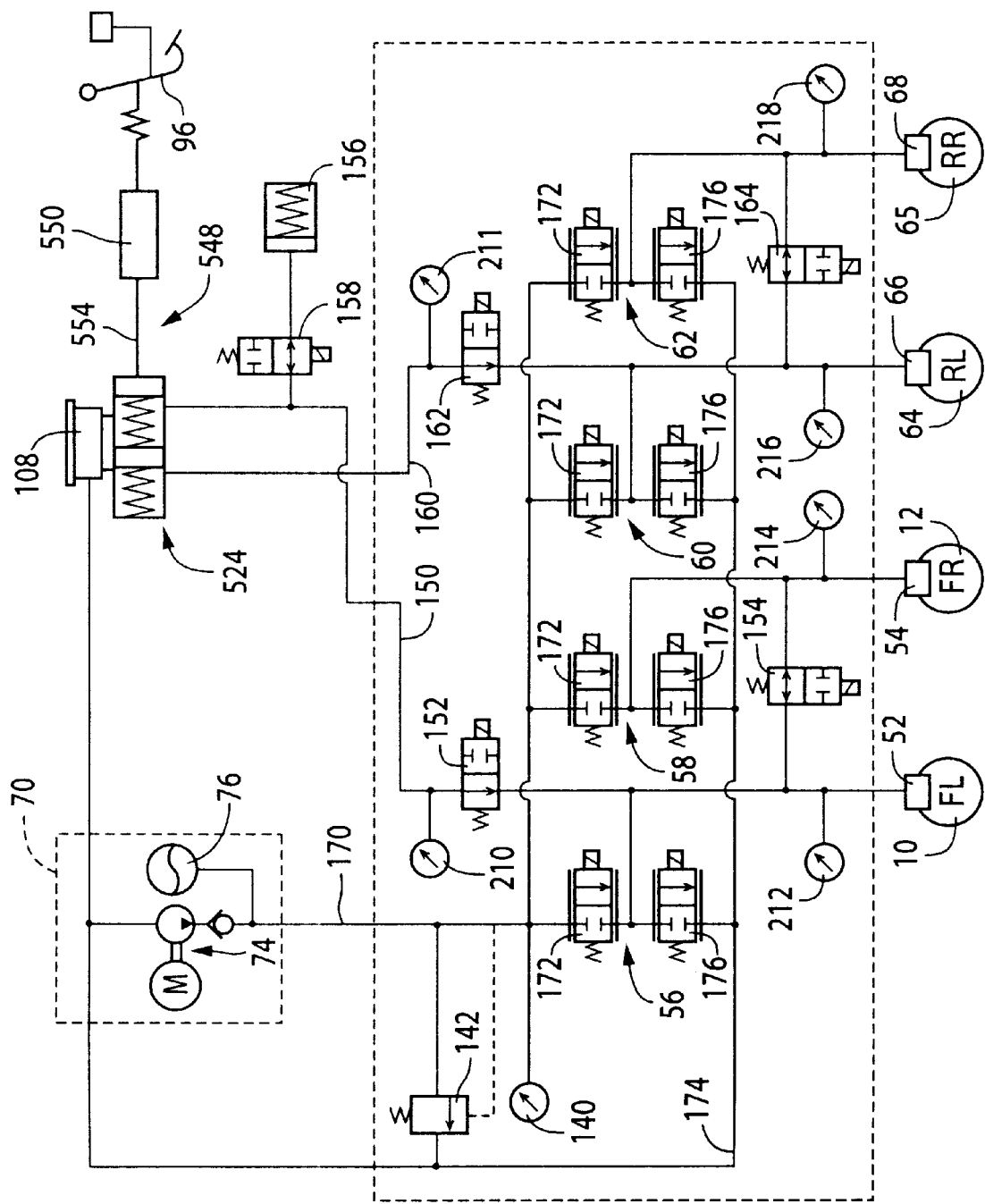
FIG. 14 is a hydraulic circuit diagram showing a hydraulic braking device included in a braking system according to a yet further embodiment of the invention.
Figure 15:
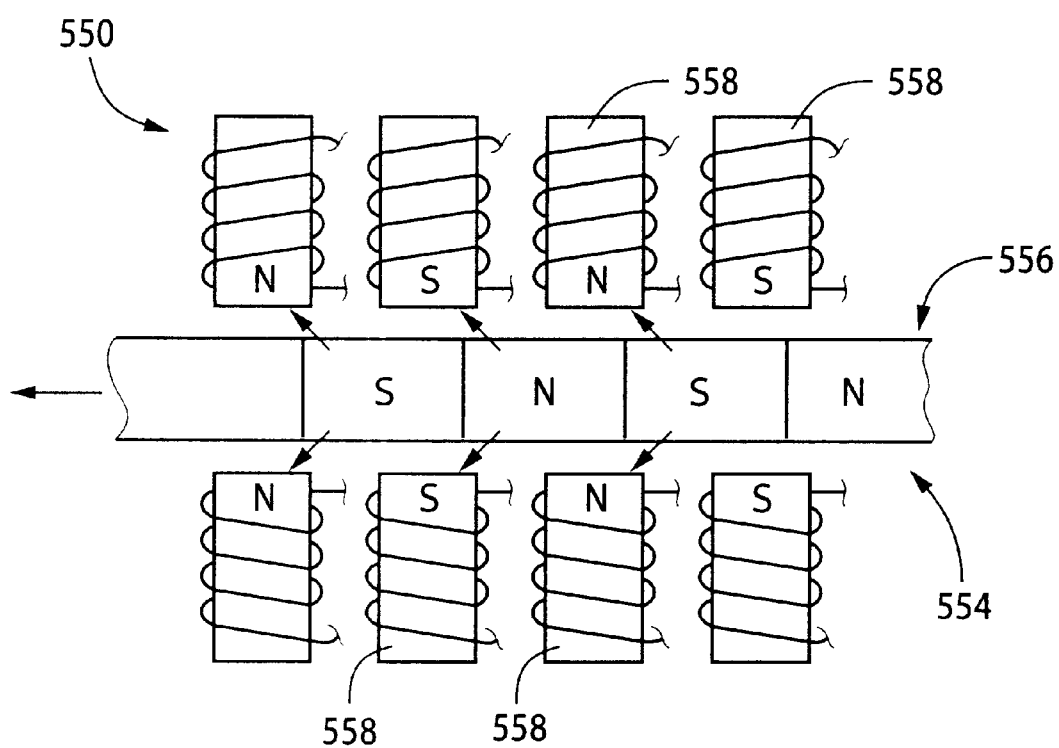
FIG. 15 is a schematic view illustrating a boosting device included in the hydraulic braking device of FIG. 14.

In a hydraulic braking device according to a tenth embodiment of this invention shown in FIG. 14, a second hydraulic pressure source 548 includes an electromagnetic boosting device 550 operable to perform a boosting function based on an electromagnetic force. The electromagnetic boosting device 550 includes a driven portion 556 having an operating rod 554, and a plurality of drive coils 558 disposed in opposed relation with the driven portion 556. The operating rod 554 includes an magnet section. When the drive coils 558 are energized, an electromagnetic drive force is generated so as to advance the operating rod 554. By controlling the amount of electric current to be applied to the drive coils 558, the electromagnetic drive force which acts on the operating rod 554 can be controlled, to thereby control the boosting force of the electromagnetic boosting device 550.

It is desirable to use an electric power source for applying an electric current to the drive coils 558, in addition to an electric power source for operating the pump device 74 of the first hydraulic pressure source 70. In this case, the electromagnetic boosting device 550 can be operated to control the generated electromagnetic force, even when the power source for the first hydraulic pressure source 70 is defective. The electric power source for the electromagnetic boosting device 550 may be an alternator, an auxiliary battery, the battery 36 or electric generator 38 of the drive assembly 18, or a solar cell or battery, for example.

The electromagnetic boosting device 550 is operable when the dynamic pressure system is normal as well as when the dynamic pressure system is defective. The pump device 74 of the first hydraulic pressure source 70 is arranged to pressurize the fluid received from the master cylinder 524, rather than the fluid received from the master reservoir 108. In this arrangement wherein the fluid received from the master cylinder 524 is pressurized by the pump device 74, the amount of electric energy consumed by the pump device 74 can be reduced.

Figure 16:
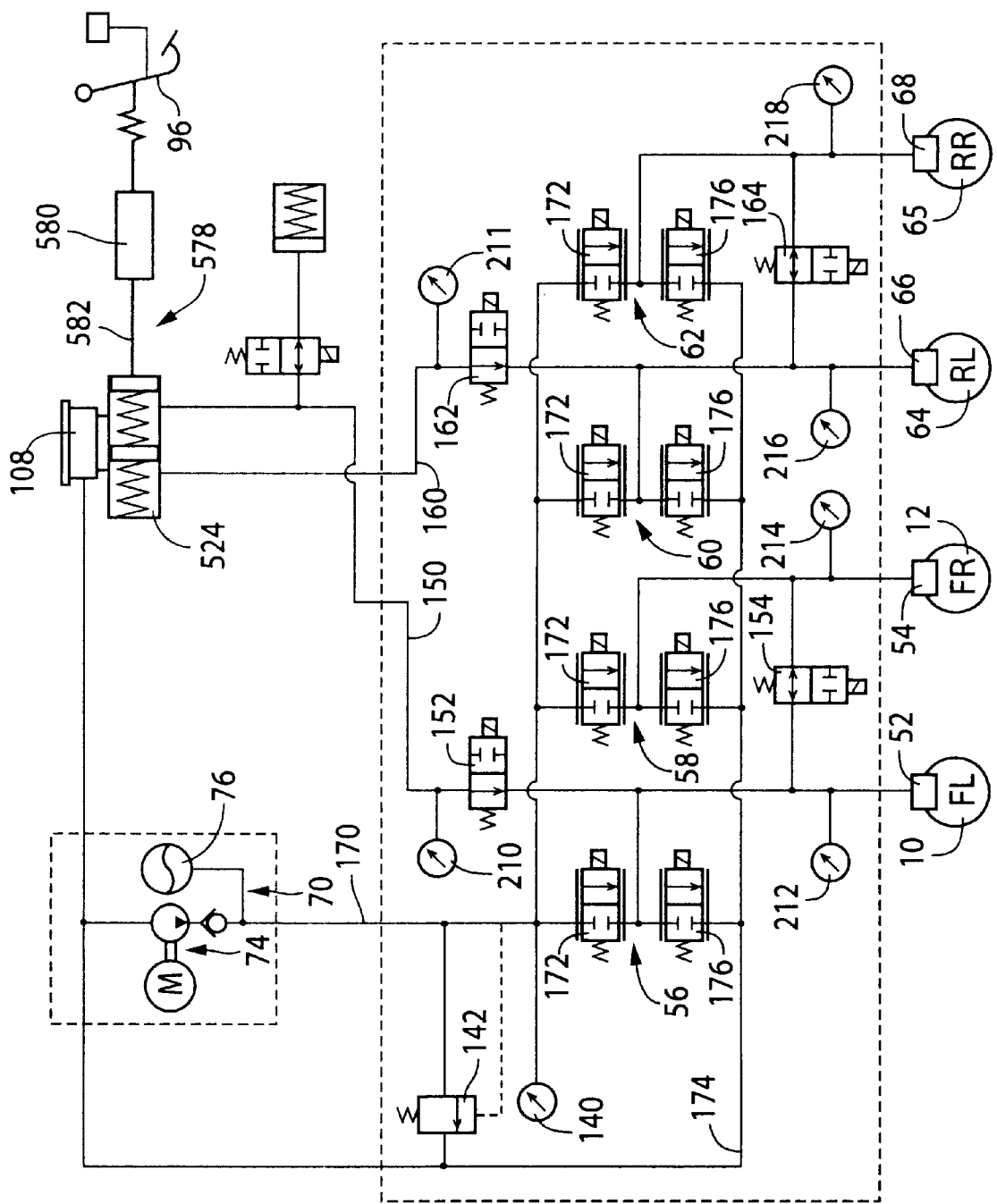
FIG. 16 is a hydraulic circuit diagram showing a hydraulic braking device included in a braking system according to still another embodiment of the invention.
Figure 17:
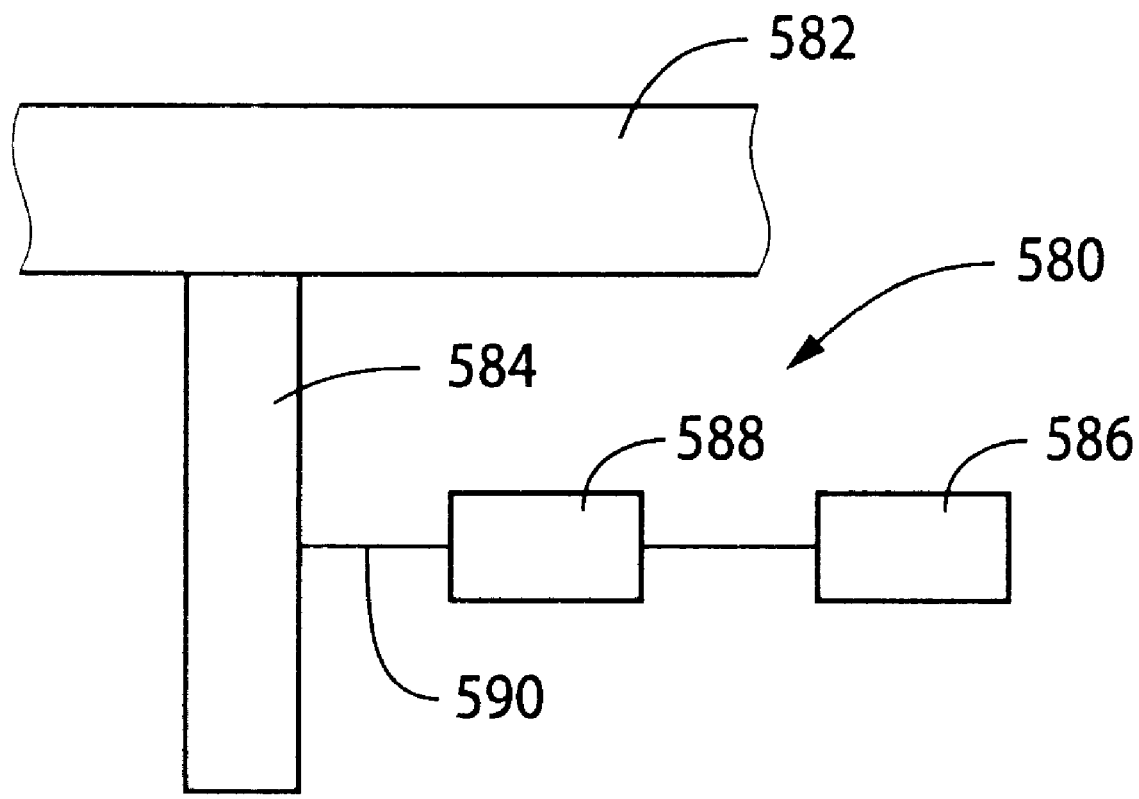
FIG. 17 is a schematic view illustrating a boosting device included in the hydraulic braking device of FIG. 16.

In a hydraulic braking device according to an eleventh embodiment of this invention shown in FIG. 16, a second hydraulic pressure source 578 includes a motor-operated boosting device 580, which includes an operating rod 582 with a driven portion 584, an electric motor 586, a motion converting device 588 for converting a rotary motion of the electric motor 586 into a linear motion, and a drive-force transmitting portion 590 for transmitting the linear motion from the motion converting device 588 to the driven portion 584, as shown in FIG. 17. When the electric motor 586 is operated, its rotary motion is converted by the motion converting device 586 into a linear motion, which is transmitted by the drive-force transmitting portion 590 to the driven portion 584, so that the operating rod 582 is moved. The operating rod 582 receives both of the operating force of the brake pedal 96 and the drive force generated by the motor-operated boosting device 580, and the brake operating force is boosted.

In this eleventh embodiment, the brake operating force can be boosted by the motor-operated boosting device 580 when the dynamic pressure system is defective. The boosting force and ratio of the boosting device 580 can be controlled by controlling the amount of electric current to be applied to the electric motor 586.

Although the braking systems including the hydraulic braking devices according to the illustrated embodiments described above are all adapted to effect the cooperative control of the hydraulic braking device and the electric motor 34 wherein the hydraulic braking force and the regenerative braking force are both applied to the vehicle, the braking system according to the present invention need not be adapted to effect the cooperative control. In this case, when a defect of the dynamic pressure system is detected, the wheel brake cylinders which have been disconnected form the second hydraulic pressure source are communicated with the second hydraulic pressure source. Where the braking effect control is effected such that the fluid pressure in the wheel brake cylinders is controlled to brake the vehicle as to establish a deceleration value corresponding to the brake operating force, the wheel brake cylinders are communicated with the second hydraulic pressure source when a defect of the pump device of the first hydraulic pressure source or the brake-cylinder-pressure control device is detective. In this case, too, the fluid pressure in the second hydraulic pressure source is increased by the pressurized fluid from the accumulator of the first hydraulic pressure source or any other accumulator provided for this purpose, so that the amount of unexpected change of the vehicle braking force due to the defect can be reduced.

Further, the braking system according to the present invention need not includes a regenerative braking device, and may be used not only for a hybrid vehicle, but also for an electric vehicle or a vehicle wherein the drive assembly does not include an electric motor. The vehicle on which the braking system is installed not be a front-drive vehicle, but may be a rear-drive vehicle or a four-wheel-drive vehicle.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system comprising:
   a brake cylinder;
   a first hydraulic pressure source including a first pump device operable to pressurize a working fluid;
   a second hydraulic pressure source operable in response to an operation of a brake operating member, to pressurize the fluid to a pressure higher than a value corresponding to an operating force acting on said brake operating member;
   a brake-cylinder-pressure control device operable when said brake cylinder is disconnected from said second hydraulic pressure source, to control the pressure of the fluid pressurized by said first hydraulic pressure source, such that a pressure of the fluid in said brake cylinder is controlled to a value determined on the basis of said operating force; and
   an emergency communication device operable when at least one of said brake-cylinder-pressure control device and said first pump device fails to normally function, to hold said brake cylinder in communication with said second hydraulic pressure source.

2. A braking system according to claim 1, wherein said second hydraulic pressure source includes at least one of a booster for boosting said operating force of said brake operating member, and a pressure-increasing device for increasing the pressure of the fluid pressurized when said brake operating member is operated, said braking system further comprising an energy storing portion for storing an energy to be used to operate at least one of said booster and said pressure-increasing device.

3. A braking system according to claim 2, wherein said first hydraulic pressure source includes a first accumulator for storing a pressurized hydraulic fluid as said working fluid pressurized by said first pump device, and wherein said first accumulator serves as said energy storing portion, and said at least one of said pressure-increasing device and said booster is hydraulically operated with said pressurized hydraulic fluid stored in said first accumulator.

4. A braking system according to claim 3, wherein said first accumulator has a large storing capacity.

5. A braking system according to claim 3, wherein said first hydraulic pressure source includes a plurality of pump devices including said first pump device, the fluid pressurized by at least one of said plurality of pump devices being stored in said first accumulator.

6. A braking system according to claim 5, wherein said plurality of pump devices includes at least one low-pressure pump device and at least one high-pressure pump device having a higher maximum delivery pressure and a lower maximum delivery rate than said at least one low-pressure pump device.

7. A braking system according to claim 2, wherein said second hydraulic pressure source includes a vacuum booster operable with a negative pressure to boost the operating force of said brake operating member, and said energy storing portion includes a vacuum tank for storing the negative pressure.

8. A braking system according to claim 2, wherein said second hydraulic pressure source includes an electrically operated booster operable with an electric energy to boost the operating force of said brake operating member, and said energy storing portion includes a battery for storing energy to be used to operate at least one of the booster and the pressure-increasing device.

9. A braking system according to claim 2, wherein at least one of said pressure-increasing device and said booster is a pneumatically operated device operable with a compressed air, and said energy storing portion includes an air tank for storing the compressed air whose pressure is higher than an atmospheric level.

10. A braking system according to claim 1, wherein said second hydraulic pressure source includes a hydraulic booster hydraulically operated to boost the operating force of said brake operating member,
   and wherein said hydraulic booster includes a pressure regulating portion for regulating the pressure of the fluid received from an accumulator, to a value corresponding to the operating force of said brake operating member, and further includes a power piston operatively connected to said brake operating member, said hydraulic booster having a booster chamber which is partially defined by said power piston and located rearwardly of said power piston as viewed in a direction in which said power piston is advanced when said brake operating member is operated, said booster chamber receiving the fluid whose pressure has been regulated by said pressure regulating portion, such that a drive force corresponding to the pressure of the fluid in said booster chamber acts on said power piston in said direction, whereby the operating force of said brake operating member is boosted.

11. A braking system according to claim 10, comprising a plurality of brake cylinders as said brake cylinder, and wherein at least one of said plurality of brake cylinders is connected to said booster chamber while the other of said plurality of brake cylinders is connected to a pressurizing chamber (86) which is partially defined by a pressurizing piston (84) and located frontwardly of said pressurizing piston as viewed in said direction, said pressurizing piston being operatively connected to said power piston.

12. A braking system according to claim 1, further comprising an emergency enabling device operable when at least one of said brake-cylinder-pressure control device and said first pump device fails to normally function, for enabling said at least one of said pressure-increasing device and said booster to operate.

13. A braking system according to claim 1, wherein said brake cylinder is provided for braking a wheel of an automotive vehicle, and said brake-cylinder-pressure control device includes:

a solenoid-operated control valve disposed between said first hydraulic pressure source and said brake cylinder and operable according to an amount of electric energy supplied thereto; and a control-valve control portion operable to control the amount of electric energy to be supplied to said solenoid-operated control valve, for controlling the pressure of the fluid in said brake cylinder such that said wheel is braked by said brake cylinder, so as to establish a deceleration value of the automotive vehicle which corresponds to the operating force of said brake operating member.

14. A braking system according to claim 1, comprising a plurality of brake cylinders as said brake cylinders, and wherein said brake-cylinder-pressure control device includes a plurality of solenoid-operated linear valve devices for controlling the fluid pressures in said plurality of brake cylinders according to amounts of electric energy supplied to said solenoid-operated linear valve devices.

15. A braking system according to claim 1, wherein said brake cylinder is provided for braking a wheel of an automotive vehicle, further comprising a regenerative braking device including an electric motor operable to apply a regenerative braking torque to said wheel, and wherein said brake-cylinder-pressure control device includes a cooperative control portion operable while said regenerative braking torque is applied to said wheel, to control the fluid pressure in said brake cylinder.

16. A braking system according to claim 1, wherein said emergency communication device includes a solenoid-operated shut-off valve which is placed in an open state for fluid communication between said brake cylinder and said second hydraulic pressure source when no electric energy is supplied to said solenoid-operated shut-off valve, and in a closed state for disconnection of said brake cylinder from said second hydraulic pressure source when an electric energy is supplied to said solenoid-operated shut-off valve, said emergency communication device further including a valve control portion for applying the electric energy to said solenoid-operated shut-off valve while said first pump device and said brake-cylinder-pressure control device are normal.

17. A braking system comprising:

a brake cylinder;

a first hydraulic pressure source including a first pump device and a first accumulator for storing a working fluid pressurized by said first pump device;

a second hydraulic pressure source operable in response to an operation of a rake operating member, to pressurize the fluid to a pressure higher than a value corresponding to an operating force acting on said brake operating member, while utilizing the pressurized fluid stored in said first accumulator;

a brake-cylinder-pressure control device operable when said brake cylinder is disconnected from said second hydraulic pressure source, to control the pressure of the fluid pressurized by said first hydraulic pressure source, such that a pressure of the fluid in said brake cylinder is controlled to a value determined on the basis of said operating force;

an emergency communication device operable when at least one of said brake-cylinder-pressure control device and said first pump device fails to normally function, to hold said brake cylinder in communication with said second hydraulic pressure source.

18. A braking system according to claim 17, wherein said second hydraulic pressure source includes a hydraulic booster hydraulically operated to boost the operating force of said brake operating member, while utilizing the pressurized fluid stored in said first accumulator.

19. A braking system according to claim 17, wherein said second hydraulic pressure source includes:

a master cylinder operable in response to the operation of said brake operating member, to pressurize the fluid to a pressure corresponding said operating force of said brake operating member; and a pressure regulator connected to said master cylinder, said first accumulator and said brake cylinder and mechanically operable to increase the pressure of the pressurized fluid received from said master cylinder while utilizing the pressurized fluid stored in said first accumulator, and apply the increased pressure to said brake cylinder.

20. A braking system according to claim 19, wherein said second hydraulic pressure source further includes a communication switching valve disposed between said pressure regulator and said brake cylinder and operable to disconnect said brake cylinder from said pressure regulator and bring said brake cylinder into fluid communication with said master cylinder when the fluid pressure of said pressure regulator becomes lower than a lower limit which is determined by and is not higher than the fluid pressure pressurized by said master cylinder.

21. A braking system according to claim 17, further comprising a high-pressure-fluid supply control device which permits a supply of the pressurized fluid from said first accumulator to said second hydraulic pressure source when at least one of said first pump device and said brake-cylinder-pressure control device fails to normally function, and inhibits said supply when said first pump device and said brake-cylinder-pressure control device are normal.

22. A braking system comprising:

a brake cylinder;

a first hydraulic pressure source including a first pump device and a first accumulator for storing a working fluid pressurized by said first pump device;

a second accumulator;

a second hydraulic pressure source operable in response to an operation of a rake operating member, to pressurize the fluid to a pressure higher than a value corresponding to an operating force acting on said brake operating member, while utilizing a pressurized fluid stored in said second accumulator;

a brake-cylinder-pressure control device operable to control the pressure of the fluid pressurized by said first hydraulic pressure source, such that a pressure of the fluid in said brake cylinder is controlled to a value determined on the basis of said operating force;

an emergency communication device operable when at least one of said brake-cylinder-pressure control device and said first pump device fails to normally function, to hold said brake cylinder in communication with said second hydraulic pressure source.

23. A braking system according to claim 22, further comprising a second pump device operable to pressurize the working fluid, and wherein said second accumulator stores the fluid pressurized by said second pump device.

24. A braking system according to claim 22, further comprising:

a fluid passage connecting said second accumulator and said first pump device;

a switch valve disposed in said fluid passage, said switch valve being operated from an open state for fluid communication of said second accumulator with said first pump device to a closed state for inhibiting the communication of said second accumulator with said first pump device when at least one of said brake-cylinder-pressure control device and said first pump device fails to normally function.

25. A braking system comprising:

a brake cylinder;

a first hydraulic pressure source including a pump device operable to pressurize a working fluid;

a second hydraulic pressure source operable in response to an operation of a brake operating member, to pressurize the fluid to a pressure higher than a value corresponding to an operating force acting on said brake operating member, said second hydraulic pressure source including at least one of a booster for boosting said operating force of said brake operating member, and a pressure-increasing device for increasing the pressure of the fluid pressurized when said brake operating member is operated;

a brake-cylinder-pressure control device operable to control the pressure of the fluid pressurized by said first hydraulic pressure source such that a pressure of the fluid in said brake cylinder is controlled to be a value determined on the basis of said operating force; and an emergency enabling device operable when at least one of said brake-cylinder-pressure control device and said pump device fails to normally function, for permitting an operation of said at least one of the brake-cylinder-pressure control device and the pump device, which operation has been inhibited.

26. A braking system comprising:

a brake cylinder;

a first hydraulic pressure source including a pump device operable to pressurize a working fluid;

a second hydraulic pressure source operable in response to an operation of a brake operating member, to pressurize the fluid, said second hydraulic pressure source including a booster for boosting an operating force of a brake operating member;

a brake-cylinder-pressure control device operable to control the pressure of the fluid pressurized by said first hydraulic pressure source such that a pressure of the fluid in said brake cylinder is controlled to be a value determined on the basis of said operating force; and an emergency boosting ratio control device operable when at least one of said brake-cylinder-pressure control device and said pump device fails to normally function, for controlling a boosting ratio of said booster while said brake cylinder is held in communication with said second hydraulic pressure source.

27. A braking system comprising:

a brake cylinder;

a first hydraulic pressure source including a pump device operable to pressurize a working fluid;

a second hydraulic pressure source operable in response to an operation of a brake operating member, to pressurize the fluid to a pressure higher than a value corresponding to an operating force acting on said brake operating member, while utilizing a highly pressurized fluid;

a brake-cylinder-pressure control device operable when said brake cylinder is disconnected from said second hydraulic pressure source, to control the pressure of the fluid pressurized by said first hydraulic pressure source, such that a pressure of the fluid in said brake cylinder is controlled to a value determined on the basis of said operating force; and an emergency communication device operable when at least one of said brake-cylinder-pressure control device and said pump device fails to normally function, to hold said brake cylinder in communication with said second hydraulic pressure source.

* * * * *